US010261813B2

(12) United States Patent
Persson et al.

(10) Patent No.: US 10,261,813 B2
(45) Date of Patent: Apr. 16, 2019

(54) DATA PROCESSING SYSTEM FOR DISPATCHING TASKS FROM A PLURALITY OF APPLICATIONS TO A SHARED RESOURCE PROVIDED BY AN ACCELERATOR

(71) Applicant: ARM Limited, Cambridge (GB)

(72) Inventors: Hakan Persson, Newmarket (GB); Wade Walker, Austin, TX (US)

(73) Assignee: Arm Limited, Cambridge (GB)

( * ) Notice: Subject to any disclaimer, the term of this patent is extended or adjusted under 35 U.S.C. 154(b) by 446 days.

(21) Appl. No.: 14/037,309

(22) Filed: Sep. 25, 2013

(65) Prior Publication Data

US 2015/0089495 A1 Mar. 26, 2015

(51) Int. Cl.
*G06F 9/455* (2018.01)

(52) U.S. Cl.
CPC ...... *G06F 9/45533* (2013.01); *G06F 9/45558* (2013.01)

(58) Field of Classification Search
CPC .......................... G06F 9/45533; G06F 9/45558
USPC .......................................................... 718/1
See application file for complete search history.

(56) References Cited

U.S. PATENT DOCUMENTS

| 5,115,499 | A | * | 5/1992 | Stiffler | G06F 9/52 |
| | | | | | 711/148 |
| 6,105,051 | A | * | 8/2000 | Borkenhagen | G06F 9/3009 |
| | | | | | 712/E9.032 |
| 6,823,472 | B1 | * | 11/2004 | DeKoning | G06F 13/1663 |
| | | | | | 710/56 |
| 8,046,758 | B2 | * | 10/2011 | Dice | G06F 9/461 |
| | | | | | 718/100 |
| 8,881,141 | B2 | * | 11/2014 | Koch | G06F 9/45558 |
| | | | | | 718/1 |
| 2005/0168472 | A1 | * | 8/2005 | Gosalia | G06F 3/14 |
| | | | | | 345/543 |
| 2006/0020842 | A1 | * | 1/2006 | Olsen | G06F 1/3228 |
| | | | | | 713/502 |
| 2009/0217275 | A1 | * | 8/2009 | Krishnamurthy | G06F 9/5077 |
| | | | | | 718/102 |

(Continued)

OTHER PUBLICATIONS

Gupta, et al., "GViM: GPU-accelerated Virtual Machines," Georgia Institute of Technology, HP Labs, 2009 Association for Computing Machinery.
Kegel, "Why is IO Virtualization the Next Big Thing?" Breakout Session #2600, Sep. 8, 2008, vmworld 2008.

(Continued)

*Primary Examiner* — Meng Ai T An
*Assistant Examiner* — Willy W Huaracha
(74) *Attorney, Agent, or Firm* — Vierra Magen Marcus LLP

(57) ABSTRACT

A data processing system comprising an accelerator that acts as a common shared resource for plural applications executing in respective virtual machines. The data processing system includes an interface mapping unit that facilitates the submission of tasks from applications to the accelerator. The interface mapping unit includes physical registers that act as physical register input/output interfaces for the accelerator. The interface mapping unit exposes a plurality of virtual accelerator input/output interfaces to the applications that are then dynamically mapped to the physical register input/output interfaces by the interface mapping unit to allow applications to access, and thereby submit a task to, a given physical register input/output interface.

22 Claims, 9 Drawing Sheets

(56) References Cited

U.S. PATENT DOCUMENTS

| | | | |
|---|---|---|---|
| 2009/0313391 A1* | 12/2009 | Watanabe | G06F 9/45558 |
| | | | 710/8 |
| 2010/0082874 A1* | 4/2010 | Baba | G06F 13/387 |
| | | | 710/316 |
| 2011/0010721 A1 | 1/2011 | Gupta et al. | |
| 2011/0320804 A1 | 12/2011 | Chan et al. | |
| 2012/0151472 A1 | 6/2012 | Koch et al. | |
| 2012/0159481 A1 | 6/2012 | Anderson et al. | |
| 2016/0179567 A1* | 6/2016 | Ding | G06F 9/45558 |
| | | | 718/1 |

OTHER PUBLICATIONS

Raj, et al., "Scalable I/O Virtualization via Self-Virtualizing Devices," CERCS, College of Computing, Georgia Institute of Technology, IBM, 2006.

Raj, et al., "Virtualization Services: Accelerated I/O Support in Multi-Core Systems," College of Computing, Georgia Institute of Technology, 2009.

Shi, et al., "vCUDA: GPU-Accelerated High-Performance Computing in Virtual Machines," Hunan University, PR China, Jun. 14, 2011.

Willmann, et al., "Concurrent Direct Network Access for Virtual Machine Monitors," High Performance Computer Architecture, 2007, IEEE 13th International Symposium, Feb. 2007.

International Search Report dated Jan. 30, 2015, in international patent application No. PCT/GB2014/052899.

* cited by examiner

DATA PROCESSING SYSTEM FOR DISPATCHING TASKS FROM A PLURALITY OF APPLICATIONS TO A SHARED RESOURCE PROVIDED BY AN ACCELERATOR

BACKGROUND

The technology described herein relates to data processing systems in which an accelerator, such as a graphics processing unit, a video accelerator, or a digital signal processor, etc., acts as a common, shared resource for a plurality of applications (such as games, productivity applications, browsers, etc.), and in particular to a method and apparatus for dispatching tasks from plural applications to the common, shared accelerator resource.

In arrangements where an accelerator such as a graphics processing unit acts as a shared resource for plural applications, then when an application requires the accelerator to perform a task, the information needed by the accelerator to perform the task must be provided to the accelerator. This is usually done by providing a set of one or more registers for the accelerator that act as an input/output interface for the accelerator that can store information needed by and provided by the accelerator when performing the task. Then when an application such as a game, wishes the accelerator to perform a task, it will make an operating system call to that effect, and the operating system driver for the accelerator will then schedule the task for the accelerator and write the appropriate task information to a register of the accelerator's input/output interface when the task is to be performed. Where the system supports plural virtual machines, there will typically also be a hypervisor that interfaces between the respective operating system and the accelerator input/output interface register(s) as well.

FIG. 1 illustrates this and shows a system 1 in which an accelerator 12 that comprises an execution unit 2 and a scheduler 9 acts as a common shared resource for plural applications (app) 3 executing on respective virtual machines (VM) 4, 5. (As shown in FIG. 1, and as will be appreciated by those skilled in the art, each virtual machine 4, 5 comprises a respective operating system (OS) 6, 7 that is executing on a common processor to provide the "virtual machine", and there are respective applications 3 operating within each operating system (virtual machine) that will then use the execution unit 2 as a resource.)

As discussed above, in order to allow the applications to use the execution unit 2 to perform tasks, the execution unit 2 has an associated input/output interface 11 comprising one or more associated sets of physical registers (slots) 8 that act as input/output interfaces for submitting tasks to the execution unit 2 (and thus to the accelerator 12) and that the respective operating system 6, 7 can store information needed by the execution unit 2 in when the execution unit 2 (the accelerator) is to perform a task for a given application.

FIG. 1 shows a system with four sets of register input/output interfaces 8, although other arrangements would, of course, be possible. As shown in FIG. 1, and as discussed above, when an application wishes to use the execution unit 2 to perform a task, it will access a set of the input/output registers 8 of the execution unit 2 via its respective operating system.

FIG. 1 also shows a scheduler 9 that acts to arbitrate between and schedule tasks in the register input/output interfaces 8. As shown in FIG. 1, the system will also include a hypervisor 10 that interfaces between the respective virtual machines (operating systems) 4, 5 and the register input/output interfaces 8 of the accelerator (execution unit) 2.

The Applicants believe that there exists scope for improvements to arrangements for dispatching tasks to an accelerator that acts as a common, shared resource to a plurality of applications.

BRIEF DESCRIPTION OF THE DRAWINGS

A number of embodiments of the technology described herein will now be described by way of example only and with reference to the accompanying drawings, in which.

Like reference numerals are used for like features throughout the drawings where appropriate.

DETAILED DESCRIPTION

Figure 1:
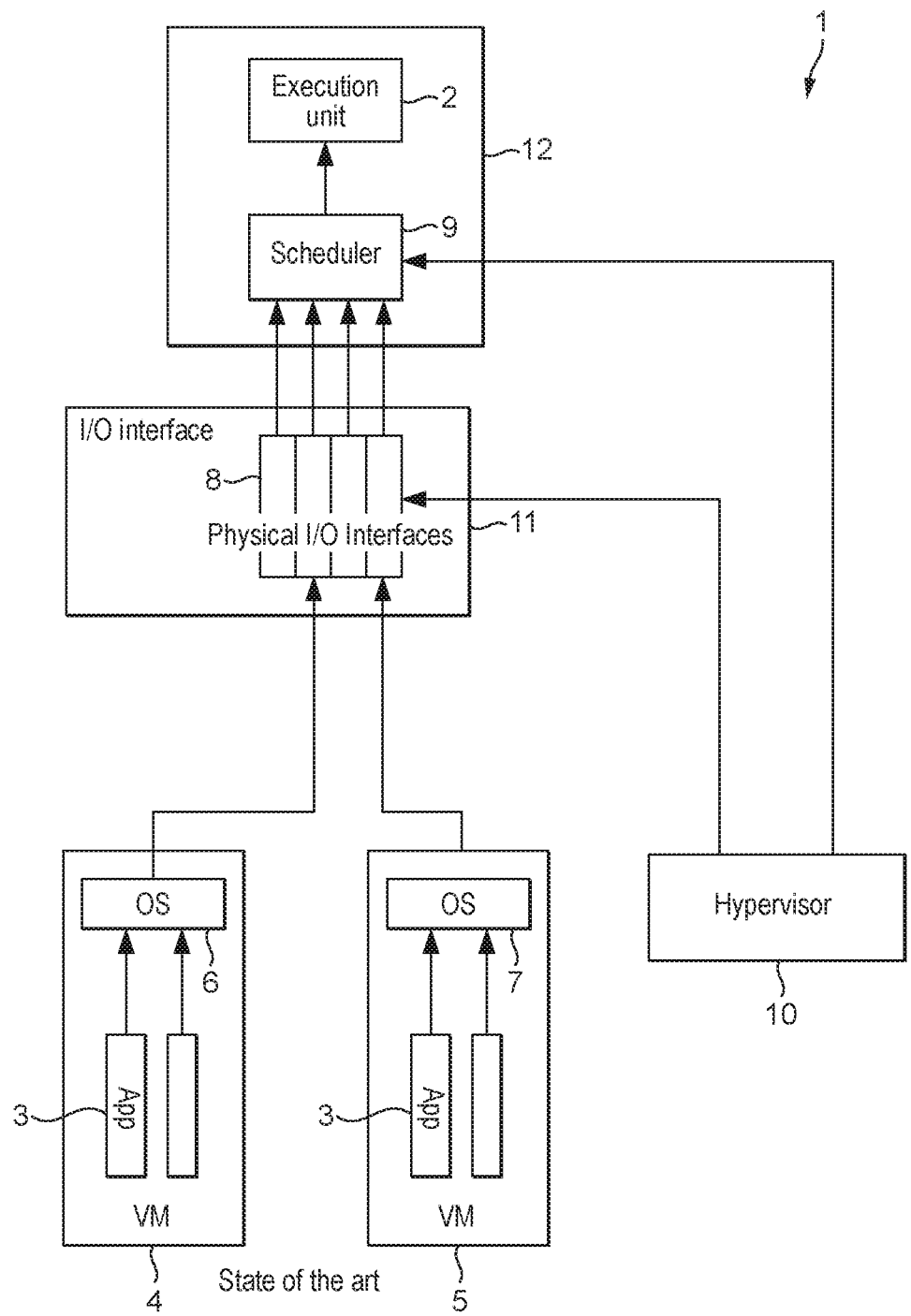
FIG. 1 shows schematically a prior art data processing system in which an accelerator acts as a shared resource for a plurality of applications.

A first embodiment of the technology described herein comprises a data processing system comprising:
  one or more processors that each execute one or more operating systems, each operating system including one or more applications; and
  an accelerator that provides a shared resource for a plurality of the applications; and
  wherein the system further comprises:
  one or more sets of physical registers that act as input/output interfaces for the submission of tasks to the accelerator; and
  an interface mapping unit that exposes a plurality of virtual accelerator input/output interfaces to the applications, the virtual input/output interfaces being mapped to respective applications, the interface mapping unit being configured to dynamically map the virtual input/output interfaces to the physical register input/output interfaces to thereby enable tasks from applications to be dispatched to the accelerator by mapping a virtual input/output interface that has been mapped to the application in question to a free physical register input/output interface provided for the submission of tasks to the accelerator.

A second embodiment of the technology described herein comprises a method of operating a data processing system that comprises:

one or more processors that each execute one or more operating systems, each operating system including one or more applications;

an accelerator that provides a shared resource for a plurality of the applications;

one or more sets of physical register input/output interfaces for the submission of tasks to the accelerator; and interface mapping unit that exposes a plurality of virtual accelerator input/output interfaces to the applications, the virtual input/output interfaces being mapped to respective applications, and configured to dynamically map the virtual input/output interfaces to the physical register input/output interfaces for the accelerator;

the method comprising:

an application when it wishes the accelerator to perform a task, accessing a virtual input/output interface to which the application has been mapped:

the interface mapping unit in response to the application accessing the virtual input/output interface, determining if a physical register input/output interface for the submission of a task to the accelerator is available, and if a physical register input/output interface is available, mapping the virtual input/output interface to the physical register input/output interface to thereby allow the application to dispatch its task to the accelerator.

The technology described herein uses an arrangement in which virtual accelerator input/output interfaces are allocated to respective applications, and then respective virtual input/output interfaces are mapped to physical register input/output interfaces for the accelerator to thereby dispatch tasks to be performed for the applications to the accelerator.

This has the advantage that the dispatching of tasks to the accelerator can be achieved without, for example, the need to go through the operating system (and then a hypervisor in a virtualised system). Each application has direct access to a virtual input/output interface exposed by the interface mapping unit, and so can, in effect, communicate with the physical register input/output interface(s) for the accelerator (via the interface mapping unit) directly.

The technology described herein also has the advantage that a large number of virtual machines can be supported with only a limited number of physical register input/output interfaces. The technology described herein also reduces latency for the accelerator starting the processing task and the latency for returning the result to the requesting application.

The accelerator may be any suitable accelerator (execution/functional unit) that can provide a common resource to an application. It could, for example, comprise a graphics processing unit (GPU), an encryption accelerator, a video accelerator, a network (processing) interface, a digital signal processor (DSP), audio hardware, etc. The accelerator can essentially comprise any component that is optimised for a particular task. In an embodiment it comprises a graphics processing unit.

The accelerator should, and in an embodiment does, comprise at least an execution unit (a functional unit) that is operable to perform tasks for applications. In an embodiment it also includes a task scheduler (as will be discussed further below). In an embodiment, the accelerator also includes the set(s) of physical register(s) that act as input/output interfaces for the submission of tasks to the accelerator. However, in an alternative embodiment, the set(s) of physical register(s) that act as input/output interfaces for the submission of tasks to the accelerator could be part of the interface mapping unit. Thus, in an embodiment, the accelerator comprises an execution unit, a task scheduler, and the physical register input/output interfaces. Other arrangements would, of course, be possible.

The task or tasks to be performed by the accelerator can be any desired and suitable tasks (e.g. depending on the nature of the accelerator), such as, and in an embodiment, a compute job. In an embodiment it is one of: drawing an object on a screen, composing multiple graphic layers into a display frame, filtering an image to reduce noise, processing data (e.g. encrypting it, wrapping it with applicable protocol layers) and, e.g., transmitting it over a network, spell checking a text against a dictionary, evaluating a time increment in a physics model, etc.

It is believed that the technology described herein will be particularly suitable for the low latency synchronous dispatch of small compute jobs (and so in an embodiment, the task or tasks is or are small compute jobs). However, the technology described herein can also be used for asynchronous dispatch and other tasks, such as graphics acceleration.

The applications may be any suitable application, such as games, camera applications, image processing applications, browsers, web servers, productivity applications (word processors, spread sheets etc.), etc.

The plural applications that are using the accelerator as a common shared resource may comprise, for example, multiple applications within a single operating system, applications distributed across multiple virtual machines (operating systems) hosted on a single (physical) processor, applications operating on multiple physical (host) processors (whether as virtual machines or not), or any combination of this. Thus, the data processing system may comprise, for example, multiple applications operating under a single operating system, multiple virtual machines operating on a single physical host processor, or multiple host physical processors (each then, e.g., hosting one or more virtual machines), or any combination thereof.

Thus the accelerator, e.g. graphic processing unit, may be a common resource shared between plural processes in an individual virtual machine or physical processor, or shared between plural virtual machines and/or physical processors, etc.

Each physical register input/output interface for the accelerator will comprise, as discussed above, a set of one or more registers that can (and that are to be used to) store information (data) that is to be used to dispatch tasks to the accelerator. The physical register input/output interface(s) may be accessible only via the virtual input/output interfaces provided by the interface mapping unit, or they may be accessible both directly and via the virtual input/output interfaces provided by the interface mapping unit. Where the physical register input/output interfaces are accessible directly, then they in an embodiment have associated memory addresses (address space) for that purpose. In this case, each separate physical register input/output interface is in an embodiment associated with (occupies) a different MMU (memory management unit) translation page of the system (and in an embodiment occupies an integer multiple of a full MMU translation page (page of address space)), as that will then facilitate the MMU page tables being used to control access to the physical register input/output interfaces.

Each physical register input/output interface can accept at least one task for the accelerator. There may only be one physical register input/output interface, but in an embodiment there is a plurality of physical register input/output interfaces (e.g. 4). Where there are plural physical register input/output interfaces, then the system in an embodiment further comprises an accelerator task scheduler that can arbitrate between tasks allocated to the physical register input/output interfaces and cause the accelerator to execute tasks that are allocated to the physical register input/output interfaces. It would also be possible to execute tasks from several physical register input/output interfaces in parallel if desired (and the accelerator has that capability). Where there are plural physical register input/output interfaces, then in an embodiment different applications (and different applications from different virtual machines, where present) can concurrently access the separate physical register input/output interfaces.

The interface mapping unit can be configured as desired. As well as exposing the virtual accelerator input/output interfaces to the applications, in one embodiment it also comprises the physical register input/output interfaces. In an embodiment, it is an appropriately configured hardware unit.

The virtual accelerator input/output interfaces provided by the interface mapping unit will, and in an embodiment do, comprise (respective) regions of address space that an application can read and write to when it wishes to submit a task to the accelerator. In an embodiment only a single application is able to access a given virtual accelerator input/output interface.

Each separate virtual input/output interface is in an embodiment associated with (occupies) a different MMU translation page of the system (and in an embodiment occupies an integer multiple of a full MMU translation page (page of address space)), as that will then facilitate the MMU page tables being used to control access to the virtual input/output interfaces.

The number of virtual accelerator input/output interfaces can be selected as desired. In view of the fact that, as will be discussed further below, each virtual accelerator input/output interface has a low "cost", the system can support a large number of virtual accelerator input/output interfaces. In an embodiment, there is at least one virtual accelerator input/output interface per application. This then facilitates using a fixed allocation of virtual accelerator input/output interfaces to applications.

The mapping of the virtual accelerator input/output interfaces to the applications can be configured as desired. It could be a fixed or a dynamic mapping. In an embodiment, the mapping of virtual accelerator input/output interfaces to applications changes very rarely (e.g. once per hour). In an embodiment the CPU (host processor) MMU (memory management unit) maps the virtual accelerator input/output interfaces to the applications. In an embodiment one or more virtual accelerator input/output interfaces are mapped to each application.

The virtual accelerator input/output interfaces may be mapped (allocated) to applications in any desired and suitable manner. In an embodiment this may be, and is in an embodiment, done on demand. In an embodiment, the operating system manages the allocation of virtual accelerator input/output interfaces to its respective applications. In a virtualised system, the hypervisor in an embodiment manages the allocation of virtual accelerator input/output interfaces to each of its respective virtual machines (operating systems), with the operating system within each virtual machine then managing the allocation of virtual accelerator input/output interfaces to each of its applications.

In one embodiment, a selected, e.g. predefined, number of virtual accelerator input/output interfaces (regions of address space) is allocated to each operating system and/or application.

In an embodiment, the address space for the virtual accelerator input/output interfaces is initially mapped as invalid pages, with a virtual accelerator input/output interface then being allocated by generating a page fault on the first access by an application to the address and the (software) module managing the allocation of the virtual accelerator input/output interfaces (e.g. either the hypervisor or operating system) then mapping a free virtual accelerator input/output interface (if available) to the requested address.

When the available virtual accelerator input/output interfaces are all allocated, existing allocated virtual accelerator input/output interfaces can in an embodiment be freed for use, e.g. based on the oldest allocation or at random, or in any other desired manner. Where an allocated virtual accelerator input/output interface is to be re-allocated in this manner, it is in an embodiment first checked that the virtual accelerator input/output interface to be freed is not currently mapped to a physical register input/output interface (if so the existing allocation should be maintained (or restored) and another virtual accelerator input/output interface freed instead).

Each virtual accelerator input/output interface in an embodiment has only one or only two (physical) registers associated with it (i.e. that can be accessed (read/written to) via the virtual interface) before it has been mapped to (allocated) a physical register input/output interface. These registers in an embodiment comprise an "allocate" register (as will be discussed below), or an allocate register and an "event timeout" register (as will be discussed below). The allocate register is in an embodiment read when an application process wishes to dispatch a task to the accelerator (needs a physical register input/output interface allocation), as will be discussed further below. In one embodiment, the allocate register is a read-only register. In another embodiment, the allocate register can be both read from and written to.

In an embodiment, plural, and in an embodiment all, of the virtual accelerator input/output interfaces share the same, single allocate register. Similarly, as will be discussed below, in an embodiment, plural, and in an embodiment all, of the virtual accelerator input/output interfaces share the same, single event timeout register.

An application (an application thread) can request and be allocated a physical register input/output interface for dispatching its task to the accelerator in any desired or suitable manner. In an embodiment, the allocation of a physical register input/output interface to an application (to an application thread) (the mapping of a virtual accelerator input/output interface to a physical register input/output interface) is triggered by reading a register (an allocate register) of (associated with) the virtual accelerator input/output interface. Thus, in an embodiment, when an application (an application thread) requires a physical register input/output interface in order to be able to dispatch a task to the accelerator, it in an embodiment reads an "allocate" register associated with a virtual accelerator input/output interface that it has been associated with (mapped to).

In response to this, the interface mapping unit that exposes the virtual accelerator input/output interfaces to the applications and maps the virtual accelerator input/output interfaces to the physical register input/output interfaces for the accelerator in an embodiment then determines if a physical register input/output interface for the accelerator is currently free, and if it is, allocates (binds/maps) the physical register input/output interface to the virtual accelerator input/output interface in question.

The interface mapping unit in an embodiment also returns to the application (to the application thread) in question in response to the register read a value that indicates that a physical register input/output interface is available and has been allocated to the application.

The value that is returned to the application as part of this operation is in an embodiment also used as an identifier for the task in question, which can then in an embodiment be used, as will be discussed further below, to otherwise control and manipulate the task in question. The task identifier is in an embodiment an identifier, such as a counter value, that can uniquely identify the task in question, and is, as will be discussed further below, in an embodiment used after dispatch of the task to aid management of the task. In embodiments, the task identifier can be used for one or more of, and in an embodiment all of: allowing the application to request the operating system to stop the task; to identify which task an error message corresponds to; and to allow the accelerator to request services from the application, such as memory allocation or to provide other feedback such as logging of performance metrics of the task. The task identifier could be used for other things, as well or instead, if desired.

The mapping of the physical register input/output interface to the virtual accelerator input/output interface in question can be performed as desired. In an embodiment, the interface mapping unit determines which virtual input/output interface was used to access it (e.g., and in an embodiment, by extracting a part of the address used for the bus transaction), and then associates that virtual input/output interface (region of address space) with the physical register input/output interface in question.

Then, when a bus transaction is made to a virtual input/output interface and the virtual input/output interface in question matches a virtual input/output interface that has a current allocation (a current mapping) to a physical register input/output interface, the bus transaction is directed to the appropriate physical register input/output interface. Otherwise (i.e. if the transaction is made to a virtual input/output interface that does not have a current allocation (that is not currently mapped to a physical register input/output interface), then only the (in an embodiment common) allocate and event timeout (if present) registers are accessible through the virtual input/output interface.

Thus, once an application's virtual accelerator input/output interface has been mapped to a physical register input/output interface of the accelerator, the register(s) of the physical register input/output interface of the accelerator will be accessible to (visible to) the application through its virtual accelerator input/output interface (by writing to (and reading from) its virtual accelerator input/output interface).

If a physical register input/output interface is available when a request is made by an application (and is allocated to the application), then the application (the application thread) should, and in an embodiment does, communicate the appropriate description of the task it requires to the accelerator (i.e. if one of the physical register input/output interfaces has been allocated (mapped) to the virtual accelerator input/output interface, the application can then dispatch work to the accelerator).

This is in an embodiment done by placing appropriate data in the register or registers associated with the physical register input/output interface in question. This can be done as is desired, for example either by putting the relevant task description data (the information needed by the accelerator to perform the task) in the register(s), or by placing in a register or registers a pointer or pointers pointing to the relevant memory address or addresses where the task description data is stored. In an embodiment, this process comprises placing a single pointer to a task descriptor memory address in the appropriate register for the physical register input/output interface in question.

If, in response to the reading of the "allocate" register in the virtual accelerator input/output interface by an application, the interface mapping unit determines that there is no physical register input/output interface available, it in an embodiment returns in response to the read operation a value, such as "0", that has been predefined as indicating that the allocation request has "failed".

In an embodiment, the physical register input/output interface allocation and task submission (dispatch) is performed as an atomic operation (i.e., such that the attempt to allocate the physical register input/output interface and to submit the task to the accelerator are performed as an indivisible operation). (As is known in the art, an "atomic" operation is an operation sequence that is carried out so that to every observer, it looks as if a sequence has either not been performed at all, or has been performed in its entirety. It is executed as one indivisible unit, hence the name "atomic".) This will help to avoid any issue with physical register input/output interfaces being allocated to applications, but then not having any tasks submitted on them for a long time (e.g., if the application thread is de-scheduled).

This could be done, for example, as a load-link store-conditional (LL/SC) atomic transaction, with the virtual accelerator input/output interface allocate register being read and then either returning the value (e.g., the task identifier) indicating that the allocation has succeeded or an invalid value indicating that the physical register input/output interface allocation has failed, and the linked store to the virtual accelerator input/output interface allocate register writing, e.g., the pointer to the task descriptor in the register(s) associated with the physical register input/output interface in question.

In this arrangement (and otherwise), the allocate register and the physical input/output interface register that the pointer to the task descriptor is written to may be the same register (e.g. in the case of an architecture that requires that the LL/SC load/store pair must be to the same address), or they may be different registers (e.g. if the system in question does not have such a restriction).

A compare and swap (CAS) atomic operation could also or instead be used for physical register input/output interface allocation and task submission. In this case "a potential task identifier" register is in an embodiment provided such that a "potential task identifier" can be read first and return the expected value of the task identifier for the next task submitted. Then, an atomic compare and swap operation is performed on the "allocate" register with the read potential job identifier being used as the expected read value, and the new register value to be written being the pointer to the task descriptor. If the compare operation is successful, then the task will be (and has been) submitted.

In an embodiment, if an application (an application thread) receives an indication that its allocation request has failed, it in an embodiment retries its request for an allocation of a physical register input/output interface (e.g., and in an embodiment, again by attempting to read an "allocate" register of a virtual accelerator input/output interface that it has been mapped to), at a later time. This may be repeated for any desired number of "retries", as desired.

Such retrying of an allocation request could be performed, e.g., after waiting for a selected period of time.

In an embodiment, the system is configured such that an application (an application thread) that is awaiting a physical register input/output interface allocation is triggered to retry its allocation request in response to a particular event or events (and in an embodiment only in response to a particular event or events), such as an indication that a physical register input/output interface has become free (available). This helps to provide a more power efficient "re-try" mechanism, as it can avoid applications (application threads) retrying their allocation requests when it is inevitable or at least likely that the request will fail. Thus, in an embodiment, an application (an application thread) will only retry its allocation request in response to a particular, "wake-up", event or events. The system may be, and is in an embodiment, configured to generate (at the appropriate time) appropriate "wake-up" events to trigger the retrying of allocation requests by applications. This is in an embodiment also done when waiting for a task to be completed (as will be discussed further below).

In an embodiment, the arrangement is such that applications (application threads) waiting for a physical register input/output interface allocation will retry their requests for a selected, in an embodiment predetermined period of time and/or number of retries, but if still unsuccessful will then be de-scheduled (stop retrying). This is in an embodiment also done when waiting for a task to be completed (as will be discussed further below).

This can then allow another application (or thread in the same application) to use the host processor (CPU) if the physical register input/output interface allocation does not seem likely to happen soon. (However, because de-scheduling an application thread (and scheduling another thread on the CPU) may take some time, and de-scheduling could also cause a delay (and CPU work) for re-scheduling before the application thread can be scheduled again when a physical register input/output interface becomes available, it can be desirable to try to wait without de-scheduling for a while first.)

In this case, any "de-scheduled" application (application thread) that is awaiting a physical input/output interface allocation is in an embodiment subsequently "re-scheduled" (i.e. returns to its state of re-trying its allocation request) at a later time. Such "re-scheduling" could be done by the, e.g., operating system, to re-schedule the application thread at some later point in time, e.g. depending on a set of pre-defined scheduling policies.

In an embodiment, a de-scheduled application (application thread) can indicate (e.g., and in an embodiment, to the operating system) that it is not required to be re-scheduled again until after a certain event or events have occurred. Such events may comprise, for example, and in an embodiment, an active task on the accelerator completing, a physical register input/output interface becoming available, and/or a given timeout period expiring. There could also be other events of interest, depending on the application that the thread belongs to.

Thus, in an embodiment, any "de-scheduled" application (application thread) that is awaiting a physical register input/output interface allocation is in an embodiment "re-scheduled" (i.e. returns to its state of re-trying its allocation request) in response to a particular event or events occurring, such as a physical register input/output interface becoming free (available).

In an embodiment, an application (an application thread) is de-scheduled upon the expiry of a "de-schedule" timeout process. Thus, in an embodiment a timeout process is performed for any applications (application threads) that are awaiting a physical register input/output interface allocation to then de-schedule those applications (application threads) when that timeout expires. Thus, in an embodiment, each application has a "de-schedule" timeout value associated with it that is used for this purpose.

In one such embodiment, all the waiting applications (application threads) share the same "de-schedule" timeout counter, and the timeout counter is in an embodiment maintained at the earliest timeout value of the waiting applications (application threads) in question (thus the counter is in an embodiment set to a shorter period if an application (an application thread) having a "de-schedule" timeout period that is less than the current "de-schedule" timeout period starts to wait for a physical register input/output interface allocation).

To facilitate this operation, all the virtual accelerator input/output interfaces in an embodiment have access to a common "event timeout" register, that a waiting application (application thread) writes its "de-schedule" timeout value to when it starts to wait for a physical register input/output interface allocation, with the accelerator implementing a timeout counter that starts when the "event timeout" register is first written. In an embodiment the timeout counter is initialized to the value written and counts down to zero (or vice-versa—the counter counts up to the register value), and when zero is reached an event is signalled (to the CPU) to de-schedule any application thread waiting for a physical register input/output interface.

In these arrangements, the "de-scheduling" could take place immediately the timeout register reaches zero, or the arrangement could be such that when an application (an application thread) "wakes up" to retry its allocation request, if the allocation request does not succeed at that time, the timeout counter is then checked, and if it has expired (e.g. reached zero) the application (the application thread) is then de-scheduled.

In an embodiment if the "event timeout" register is subsequently written with a value smaller than the current timeout count then the timeout count is updated to the new lower value (if the written value is higher then it is ignored) (or vice-versa where the counter counts up to the register value). This has the effect that there is one "event timeout" register shared between all virtual accelerator input/output interfaces, with the earliest timeout configured being used for signalling the "de-schedule" event.

In an embodiment, the accelerator generates a "re-schedule" event and/or a "wake-up" event, and in an embodiment both, when a physical register input/output interface becomes available and/or (if different) when a task completes.

It is believed that the use of a shared event timeout register for de-scheduling application threads that are waiting for events may be new and advantageous in its own right, and not just in the context of the operation in the manner of the above embodiments of the technology described herein. For example, this could be used to provide a power efficient "wait for event" mechanism with a reduced overhead for setting up the timeout.

Thus, another embodiment of the technology described herein comprises a method of operating a data processing system that comprises:
  one or more processors that each execute one or more operating systems, each operating system including one or more applications, each application when executing, executing one or more application threads;
  the method comprising:
  when an application thread needs to wait for an event to occur before it can continue its operation:
    the application thread writing an event timeout period value for the application to a shared event timeout register that can be written to by plural applications, and then executing an instruction to wait for the event, the event timeout period value indicating a time period after which the application thread will request to be de-scheduled if the event that the application thread is waiting for has not happened yet;

the data processing system signalling when a selected event or events occur and counting the event timeout period set in the shared event timeout register;

the application thread, when an event is signalled while it is waiting for an event, determining if the signalled event is the event that the application thread is waiting for; and if the event that the application thread is waiting for has occurred, the application thread continuing its processing; or if the event that the application thread is waiting for has not occurred, the application thread then checking if the event timeout period set in the shared event timeout register has expired; and if the event timeout period has expired, requesting the operating system to de-schedule the thread; or if the event timeout period has not yet expired, returning to waiting for its event to occur.

Another embodiment of the technology described herein comprises a data processing system comprising:

one or more processors that each execute one or more operating systems, each operating system including one or more applications, each application when executing, executing one or more application threads; and an event timeout register to which application threads can write an event timeout period value when they are waiting for an event to occur before they can continue their operation, the event timeout period value indicating a time period after which the application thread will request to be de-scheduled if the event that the application thread is waiting for has not happened yet; wherein:

the event timeout register is shared between plural applications, such that threads from plural applications each write their event timeout values to the same, shared event timeout register.

In this case, the system is accordingly in an embodiment configured such that:

when an application thread needs to wait for an event to occur before it can continue its operation:

the application thread writes an event timeout period value for the application to the shared event timeout register that can be written to by plural applications, and then executes an instruction to wait for the event;

the processor or processors signal when a selected event or events occur and count the event timeout period set in the shared event timeout register;

the application thread, when an event is signalled while it is waiting for an event, determines if the signalled event is the event that the application thread is waiting for; and if the event that the application thread is waiting for has occurred, the application thread continues its processing; or if the event that the application thread is waiting for has not occurred, the application thread then checks if the event timeout period set in the shared event timeout register has expired; and if the event timeout period has expired, requests the operating system to de-schedule the thread; or if the event timeout period has not yet expired, returns to waiting for its event to occur.

In these embodiments of the technology described herein, an application thread sets its event timeout period by writing an event timeout value to an event timeout register that is shared between (common to) plural applications. Thus, multiple application threads can, and in an embodiment do, share the same, common, event timeout register. The applications (application threads) can, and in an embodiment do, directly write to the shared event timeout register without involving the operating system. This avoids the overhead that would otherwise be required for setting up a timeout via the operating system, and can thus make using host processor "wait for event" functionality practical for more scenarios.

In an embodiment all the currently executing applications (and application threads) share the same event timeout register, i.e. there is a single event timeout register that all applications (and application threads) share.

As will be appreciated by those skilled in the art, these embodiments of the technology described herein can, and in an embodiment do, include any one or more or all of the features of the technology described herein described herein, as appropriate.

Thus, for example, the operation in respect of the common event timeout register is in an embodiment as discussed above. Thus, the shared, common event timeout register is in an embodiment maintained at the earliest timeout value of the currently waiting applications (application threads) (i.e. the earliest timeout configured is in an embodiment used for signalling the "de-schedule" event).

Similarly, if the shared event timeout register is subsequently written with a timeout period smaller than the current timeout count, then the timeout count is in an embodiment updated to the new shorter period (if the written period is longer then it is ignored).

In an embodiment of these arrangements, the application will wait for its event in a power efficient manner, in an embodiment by stopping all program execution until an external event is registered by the host processor. Also, in an embodiment, when the application thread is de-scheduled, it can in an embodiment register a condition with the operating system for when it is to be re-scheduled. Correspondingly, when the application thread is de-scheduled, it is in an embodiment subsequently rescheduled, e.g. upon a particular event or events occurring (a condition being met), and/or after a selected time period, etc.

In an embodiment, the system monitors for the completion of tasks and "releases" a physical register input/output interface once a task has been competed.

In one embodiment, the virtual accelerator input/output interface mapping to the physical register input/output interface ends when the task dispatch occurs. In this case, when the operating system process writes the final register to dispatch its task to the accelerator, the allocation of the physical register input/output interface is in an embodiment lost, and the process can no longer access the physical register input/output interface. In this case, the completion of the task is in an embodiment signalled by updating a memory location provided as part of the task setup. The operating system process in an embodiment periodically checks (spins on) this memory location until the task completes (in an embodiment in the manner discussed above for applications re-trying their physical register input/output interface allocation requests).

In another embodiment, the virtual accelerator input/output interface mapping to the physical register input/ output interface is sustained until the process explicitly de-allocates the physical register input/output interface by writing to a register. In this case, task completion can be signalled using the register.

As well as the virtual accelerator input/output interfaces that are mapped (assigned) to applications, in an embodiment, the interface mapping unit also supports and exposes one or more operating system virtual management interfaces, and/or one or more hypervisor management interfaces (and in an embodiment both in virtualised systems that have a hypervisor(s)). These operating system and hypervisor management interfaces are in an embodiment used for the management, manipulation and control of tasks that are in progress. (As there will usually only be one hypervisor, there is no need for the hypervisor management interface(s) to be virtual (e.g. there could be one hypervisor management interface for each physical register input/output interface). In the case of multiple hypervisors, an additional privilege level above the hypervisors to manage the hypervisors could be provided if required.)

These operating system and hypervisor management interfaces in an embodiment comprise respective regions of address space that the operating system or hypervisor can read and write to, respectively, to access and manipulate the physical register input/output interfaces that respective tasks have been submitted to.

The operating system virtual management interface(s) are in an embodiment mapped to a physical register input/output interface as long as the task submitted from an application within that operating system is not complete. The operating system management interface in an embodiment also exposes additional registers from the physical register input/output interface to allow the operating system to communicate with the accelerator while the task is active (so as to, for example, stop or suspend the task, resolve non-fatal errors, etc.).

The hypervisor management interface is in an embodiment a direct view of the physical register input/output interface, and may expose additional registers compared to the operating system virtual management interface.

In an embodiment, the (and each) operating system has access to a management interface. In a virtualized system, each operating system in an embodiment has its own separate operating system management interface (or interfaces).

Each operating system management interface in an embodiment facilitates (allows the operating system to perform) one or more, and in an embodiment all of, the following functions: request changes to the operating system level virtual accelerator input/output interface property table pointer (this will be discussed below); inspect virtual to physical register input/output interface mappings (in a virtualized system only the physical register input/output interfaces allocated from each operating system are in an embodiment visible); inspect status of running tasks on physical register input/output interfaces and manage them (in a virtualized system in an embodiment only the physical register input/output interfaces allocated from the respective operating system are visible); free allocated physical register input/output interfaces in case a process with an active physical register input/output interface dies (in a virtualized system only the physical register input/output interfaces allocated from each operating system are in an embodiment visible); allow pre-emption of processes at any time; save (and restore) the state of physical register input/output interfaces allocated, but not yet dispatched; enable an interrupt for task completion when de-scheduling a thread waiting for a task to finish; manipulate the MMU context used for a task; and determine the identity of the application for allocated physical register input/output interfaces and running tasks belonging to the operating system (and update the application identifier mapping to processes). Other functions would also or instead be possible, if desired.

In an embodiment, access is provided through an operating system management interface to each of the physical register input/output interfaces, but only if the physical register input/output interfaces are processing a task from the operating system (virtual machine) in question. Thus the operating system virtual management interface in an embodiment comprises all the physical register input/output interfaces, but access is only allowed to the physical register input/output interfaces that contain tasks from the operating system in question (thus access rights filtering based on whether the physical register input/output interface "ownership" matches the operating system (virtual machine) trying to access it is used to control access to a physical register input/output interface via an operating system management interface).

Each hypervisor management interface is in an embodiment similar to an operating system management interface, but in an embodiment allows the hypervisor full access to all physical register input/output interfaces regardless of which virtual machine (operating system) they are allocated to at the time. Thus, the hypervisor management interface is in an embodiment supported by the same hardware as the operating system management interfaces but with different access rights compared to the operating system management interfaces. Also, the hypervisor view of the physical register input/output interface may include registers not visible in the operating system virtual management interface view.

Each hypervisor management interface in an embodiment facilitates (allows the hypervisor to perform) one or more, and in an embodiment all of, the following functions: inspect which virtual machine a physical register input/output interface is currently allocated to, or an active task belongs to; receive requests from operating system management interfaces for changes to the virtual accelerator input/output interface property table pointer; and configure the hypervisor levels of the virtual accelerator input/output interface property table. This is in an embodiment as well as the operating system management interface functions discussed above. Again, other functions would also or instead be possible, if desired.

In an embodiment, all operating system and hypervisor management functions (commands) use a task identifier (that identifies the task the function (commands) relate to). This is in an embodiment a large counter (e.g. 64 bit) that is incremented whenever a physical register input/output interface is mapped to a virtual accelerator input/output interface and that is not expected to wrap during the uptime of the system. (The task identifier could, e.g., be, and is in an embodiment, returned to an application when the physical register input/output interface allocation is done, as discussed above.)

Then, when an operating system management interface is used to manipulate a task, the task identifier provided for the command is in an embodiment used to determine the action to take. In an embodiment, if the task that the task identifier corresponds to is currently active on a physical register input/output interface and belongs to the operating system in question then the action requested is attempted, otherwise the command is ignored. A status register is in an embodiment updated as appropriate.

Hypervisor management interfaces in an embodiment use a similar mechanism, but with the difference that tasks belonging to any virtual machine (operating system) can be manipulated.

As well as the data for a task that will be provided by the operating system process itself, there may be, and in an embodiment there is, further data that is required for task submission and dispatch that is supplied by the hypervisor (if any) and/or the operating system.

To facilitate the provision of this data, in an embodiment a virtual accelerator input/output interface property table that contains the data required for task submission that is supplied by the hypervisor and/or the operating system is maintained.

In one embodiment, a single (level) virtual accelerator input/output interface property table is used. In another embodiment, multiple tables (multiple table levels) are used.

In one multiple table embodiment, the virtual accelerator input/output interface property table is split into two main levels, hypervisor and operating system. Each of the hypervisor and operating system levels may also be split into two levels, if desired, a first level that identifies the virtual machine/process (respectively), and a second level that provides the data for the identified virtual machine/process (this allows for persistent accelerator MMU context across tasks, and can help reduce dispatch latency).

The hypervisor level of the virtual accelerator input/output interface property table in an embodiment includes one or more of, and in an embodiment all of: a virtual machine identifier for the virtual accelerator input/output interface, stage 2 MMU configuration information, virtual machine level scheduling properties and information to allow the appropriate part of the operating system level of the virtual accelerator input/output interface property table to be identified (such as, and in an embodiment, pointer(s) and/or indexes into the operating system level virtual accelerator input/output interface property table).

The operating system level of the virtual accelerator input/output interface property table in an embodiment includes one or more of, and in an embodiment all of: an application identifier for the virtual accelerator input/output interface, stage 1 MMU configuration information, and operating system level scheduling properties.

(Where a single (level) table is used, that table should include all of the above information.)

The table(s) may contain other information, such as restrictions on allowed operations, if desired.

The technology described herein also extends to the provision of a interface mapping unit that can expose virtual accelerator input/output interfaces to applications and map those interfaces to physical register input/output interfaces to dispatch tasks to an accelerator.

This can then be used, for example, with an existing accelerator design to enable the accelerator to be used with virtualisation whilst requiring very little or no modification to the accelerator itself (and, potentially, without the need for detailed knowledge of the internal working of the accelerator (only the program interface may be need to be known)).

Thus, another embodiment of the technology described herein comprises a hardware unit for use in a data processing system, the data processing system comprising one or more processors that each execute one or more operating systems, each operating system including one or more applications, an accelerator that provides a shared resource for a plurality of the applications, and one or more physical register input/output interfaces that can be used for the submission of tasks to the accelerator; wherein the hardware unit is configured to:

expose a plurality of virtual accelerator input/output interfaces to applications executing on a processor or processors, and to dynamically map the virtual accelerator input/output interfaces to physical register input/output interfaces for an accelerator to thereby enable tasks for applications to be dispatched to the accelerator by mapping a virtual input/output interface associated with an application to a free physical register input/output interface that is to be used for the submission of tasks to the accelerator.

As will be appreciated by those skilled in the art, this embodiment of the technology described herein can, and in an embodiment does, include, as appropriate, any one or more or all of the features of the technology described herein described herein.

In an embodiment, the hardware unit also has associated with it a task scheduler, in an embodiment in the form of a microcontroller, that can arbitrate between tasks allocated to the physical register input/output interfaces and that can cause the accelerator to execute tasks that are allocated to the physical register input/output interfaces (i.e., that can schedule tasks submitted to the accelerator).

In an embodiment, the hardware unit also has associated with it a system MMU (memory management unit). The system MMU is in an embodiment a two stage system MMU to provide both virtualisation and operating system level virtual memory services. Such a system MMU can provide standard virtual memory functionality for an accelerator that does not itself include an internal MMU.

The technology described herein can be implemented in any suitable system, such as a suitably configured microprocessor based system. In an embodiment, the technology described herein is implemented in a computer and/or micro-processor based system.

The data processing system may also comprise, and in an embodiment does also comprise, and/or is in communication with, one or more memories and/or memory devices that store the data described herein, and/or that store software for performing the processes described herein.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a data processing system, processor, or microprocessor system comprising a data processor causes in conjunction with said data processor said processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described.

Figure 2:
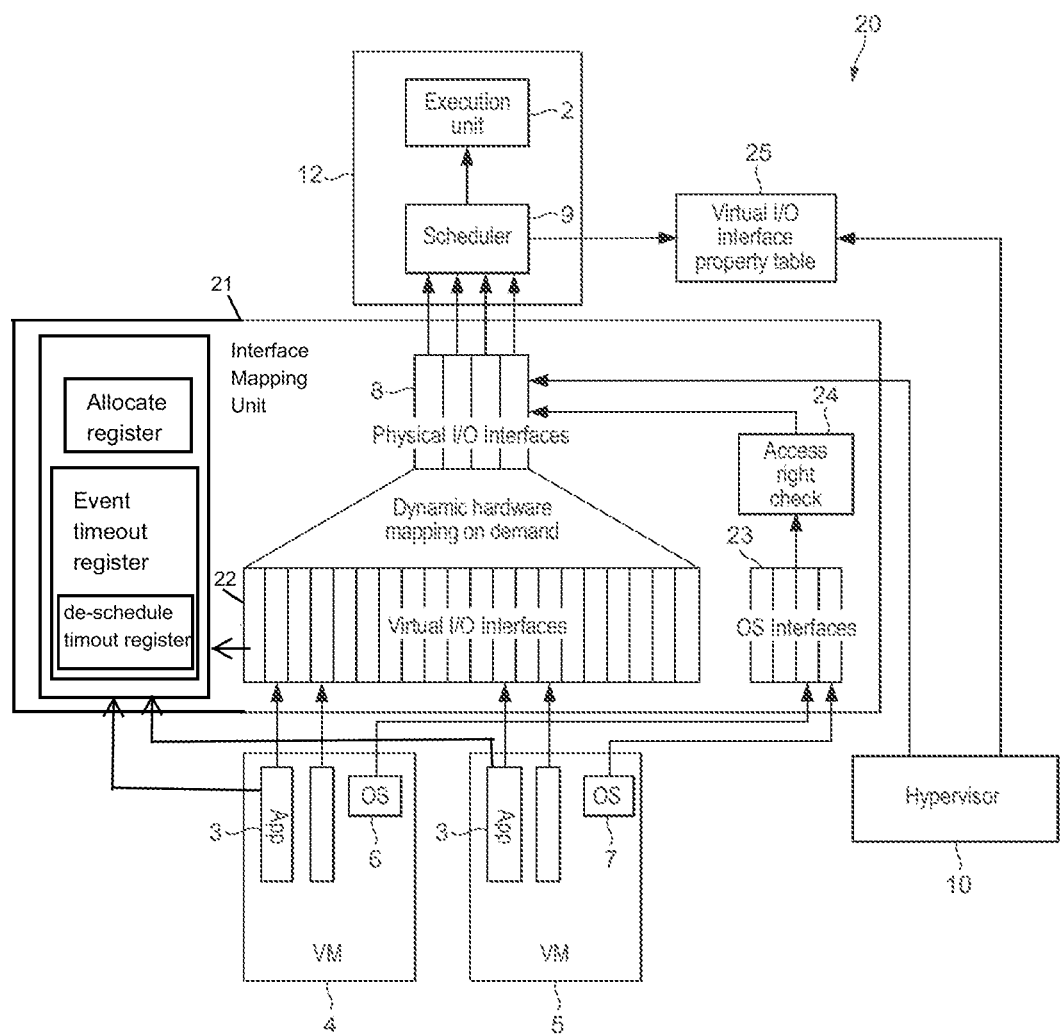
FIG. 2 shows schematically an embodiment of a data processing system in which an accelerator acts as a shared resource for a plurality of applications that is in accordance with the technology described herein.

FIG. 2 shows schematically a data processing system that is in accordance with an embodiment of the technology described herein.

As shown in FIG. 2, the data processing system 20 comprises an accelerator 12 that includes an execution unit 2 that acts as a common shared resource for plural applications (app) 3 executing in respective virtual machines (VM) 4, 5. The accelerator 12 may comprise, for example, a graphics processing unit (GPU), a cryptographic accelerator, a video accelerator, a network interface, a digital signal processor (DSP), audio hardware, or any other (hardware) component that is optimised to perform a particular task.

The virtual machines 4, 5 will, as known in the art, comprise respective operating systems 6, 7 executing on a given physical processor (CPU). Although FIG. 2 shows two virtual machines 4, 5 for illustration purposes, as will be appreciated by those skilled in the art, there may be only one or more than two virtual machines, and there may also be a plurality of physical processors each hosting one or more virtual machines (operating systems).

Each virtual machine (operating system) will have one or more applications 3 executing on it, that can and will use the accelerator 12 as a shared resource.

As shown in FIG. 2, the system also includes hypervisor 10 for the virtual machines 4, 5.

As shown in FIG. 2, in order to allow applications 3 executing on the virtual machines 4, 5 to submit tasks to the execution unit 2, the data processing system 20 includes an interface mapping unit 21 that facilitates the submission of tasks from applications to the execution unit 2 of the accelerator 12.

The applications 3 may be any suitable applications, such as games, camera applications, image processing applications, browsers, web servers, productivity applications, etc. Correspondingly, the task or tasks to be performed by the accelerator (execution unit) 2 can be any desired and suitable tasks (e.g. depending on the nature of the accelerator), such as drawing an object on the screen, composing multiple graphic layers into a display frame, processing an image to reduce noise, processing data, performing a desired compute job, etc.

As shown in FIG. 2, the interface mapping unit 21 comprises, inter alia, four (in the present embodiment) sets of physical registers 8 that each respectively act as a physical register input/output interface for the execution unit 2 of the accelerator. (Other numbers and arrangements of physical register input/output interfaces would, of course, be possible.)

Each physical register input/output interface 8 can be used for the submission and dispatch of tasks to the accelerator 12 and comprises one or more registers in which data needed to submit a task to the accelerator can be stored. In the present embodiment this data comprises a pointer to a descriptor in main memory where the data required for the task in question is stored. Other arrangements, such as directly loading task descriptive fields to registers of the physical register input/output interfaces would be possible, if desired.

Each physical register input/output interface can accept at least one task for the accelerator, and, in the present embodiment, occupies an MMU page of address space. Different applications from different virtual machines can concurrently access the separate physical register input/output interfaces.

As shown in FIG. 2, the data processing system 20 also includes an accelerator task scheduler 9 (that is part of the accelerator 12) that arbitrates between tasks submitted to the physical register input/output interfaces 8 and causes the execution unit 2 of the accelerator 12 to execute the tasks as required. Depending on the capabilities of the execution unit 2, tasks from several physical register input/output interfaces 8 may be executed in parallel, if desired.

The interface mapping unit 21 may be configured as desired. In the present embodiment it includes a bus interface for incoming transactions from the host CPU, and a bus interface for bus transactions towards the physical register input/output interfaces for the accelerator 12. The interface mapping unit 21 filters transactions from the host CPU to the physical input/output interface registers, and modifies the addresses to match the correct instance of the physical input/output registers. To do this, the interface mapping unit 21 keeps track of which virtual accelerator input/output interfaces are mapped to which physical register input/output interface. It also receives status signals from the accelerator task scheduler 9, such as which physical register input/output interfaces are currently in use, and also implements the event timeout and allocate registers (discussed below). (It would also be possible for the interface mapping unit 21 to be tightly integrated with the physical input/output registers, if desired.)

As shown in FIG. 2, rather than the applications 3 executing on the virtual machines being able to directly access a physical register input/output interface 8 of the interface mapping unit 21, the interface mapping unit 21 instead exposes a plurality of virtual accelerator input/output interfaces 22 to the applications 3. As will be discussed further below, these virtual accelerator input/output interfaces 22 can then be dynamically mapped to the physical register input/output interfaces 8 by the interface mapping unit 21 to allow the applications to access, and thereby submit a task to, a given physical register input/output interface 8.

Each virtual accelerator input/output interface 22 comprises a region of address space that is associated with (and thus identifies) the virtual accelerator input/output interface in question. In the present embodiment, each virtual accelerator input/output interface is associated with (occupies) one MMU page (or an integer multiple number of MMU pages) of address space.

As shown in FIG. 2, there can be a large number of virtual accelerator input/output interfaces 22, as the "cost" of a virtual accelerator input/output interface is essentially only the storage for the virtual accelerator input/output interface property table entry for the virtual accelerator input/output interface in question in main memory (this will be discussed further below).

In the present embodiment one or more virtual accelerator input/output interfaces 22 are mapped to (associated with) respective applications 3 executing on the virtual machines 4, 5. This mapping is performed in the present embodiment by the host processor (CPU) memory management unit (MMU) mapping virtual accelerator input/output interfaces to the applications on demand, in the following manner.

The virtual accelerator input/output interfaces 22 are allocated to applications 3 in the present embodiment in two steps. The hypervisor 10 manages allocation of virtual accelerator input/output interfaces to each virtual machine 4, 5, and the operating system 6, 7 within each virtual machine then manages the allocation of virtual accelerator input/output interfaces to each application (of the virtual machine in question).

In the present embodiment, a standard number of virtual accelerator input/output interfaces is provided to each client (i.e. OS or application), but the address space for these virtual accelerator input/output interfaces is initially mapped as invalid pages. Then, on the first access to the address space in question, a page fault is generated and the software module managing the allocation of the virtual accelerator input/output interfaces (i.e. either the hypervisor or OS, as appropriate) then maps a free virtual accelerator input/output interface (if any) to the requested address and updates the virtual accelerator input/output interface property table accordingly.

If all the available virtual accelerator input/output interfaces 22 are already allocated when a new virtual accelerator input/output interface request is made, then one of the allocated virtual accelerator input/output interfaces is freed for use. The freed virtual accelerator input/output interface can be selected as desired, e.g. on a first-in, first-out, or random, basis. The software module managing the virtual accelerator input/output interface allocation process checks that the virtual input/output interface to be freed is not currently mapped to a physical register input/output interface (and if it is, restores that mapping and frees another virtual accelerator input/output interface instead).

Other arrangements for allocating the virtual accelerator input/output interfaces 22 to applications, etc., would, of course, be possible, if desired.

The virtual accelerator input/output interfaces 22 have associated with them an allocate register and an event timeout register. The allocate register is read when an application wishes to be allocated a physical register input/output interface to allow it to submit a task to the accelerator 2. The event timeout register is used to trigger the rescheduling of applications (application threads) that are awaiting a physical register input/output interface allocation. In the present embodiment, all the virtual accelerator input/output interfaces 22 share the same, single allocate register and the same, single event timeout register. Other arrangements would, of course, be possible.

Each virtual accelerator input/output interface 22 exposed by the interface mapping unit 21 has a corresponding entry in a virtual accelerator input/output interface property table 25 that stores data (properties) associated with the virtual accelerator input/output interface in question, such as the identity of the virtual machine that the virtual accelerator input/output interface has been allocated to, the identity of the application that the virtual accelerator input/output interface has been allocated to, any necessary (e.g. stage 1 and stage 2) MMU (memory management unit) configuration information, and any virtual machine and operating system scheduling properties that are associated with the virtual accelerator input/output interface.

The virtual accelerator input/output interfaces 22 are used to access the physical register input/output interfaces 8 when a task is to be submitted to the accelerator 2. To do this, an application wishing to submit a task to the accelerator 2 will first access its virtual accelerator input/output interface to read the allocate register.

In response to this, the interface mapping unit 21 will determine if a physical register input/output interface 8 for the accelerator is currently free. If there is a currently free physical register input/output interface, then the interface mapping unit 21 allocates (binds/maps) the physical register input/output interface to the virtual accelerator input/output interface in question and returns to the application in question in response to the allocate register read, a task identifier that indicates that a physical register input/output interface is available and has been allocated to the application, and also that is to be used as an identifier for the task in question. This task identifier is generated by a large counter (e.g. 64-bit) which is not expected to wrap during the uptime of the system, and that is incremented whenever a physical register input/output interface is mapped to a virtual accelerator input/output interface (i.e. for each task that is granted a physical register input/output interface for its submission). As will be discussed further below, the task identifier is then used to identify the task in question, and can be used to otherwise control and manipulate the task and associated virtual accelerator input/output interface in question.

To map a physical register input/output interface to the virtual accelerator input/output interface in question, the interface mapping unit 21 determines which virtual input/output interface was used to access it by extracting a part of the address used for the bus transaction, and then associates that virtual input/output interface (region of address space) with the physical register input/output interface in question.

Then, when a bus transaction is made to a virtual input/output interface and the virtual input/output interface in question matches a virtual input/output interface that has a current allocation (a current mapping) to a physical register input/output interface, the bus transaction is directed to the appropriate physical register input/output interface. Otherwise (i.e. if the transaction is made to a virtual input/output interface that does not have a current allocation (that is not currently mapped to a physical register input/output interface), then only the common allocate and event timeout registers are accessible through the virtual input/output interface.

If, in response to the reading of the allocate register by an application, the interface mapping unit 21 determines that there is not physical register input/output interface currently available, then the interface mapping unit returns in response to the allocate register read a value, such as "0", that has been predefined as indicating that the allocation request has "failed". In this case, the application then "spins" on the allocate register to retry its allocation request until the allocation succeeds.

Thus, the virtual accelerator input/output interface allocate register will, when read by an application, return either a task identifier for the application's task, or an invalid value indicating that allocation failed.

When a physical register input/output interface 8 has been allocated and mapped to the virtual accelerator input/output interface 22, the application can then dispatch its task to the accelerator 2.

To do this, the application writes (via its associated virtual accelerator input/output interface) a pointer or pointers pointing to the relevant memory address or addresses where the task description data is stored in the physical register input/output interface 8 that has been allocated to its virtual accelerator input/output interface.

In the present embodiment, the physical register input/output interface allocation and task submission is performed as an atomic Load-Link/Store-Conditional (LL/SC) transaction. This has the effect that the attempt to allocate the physical register input/output interface 8 and to then submit the task is an indivisible operation, thereby avoiding any issue with physical register input/output interfaces being allocated but not having any task submitted on them for a long time (for example if the thread is de-scheduled).

Figure 3:
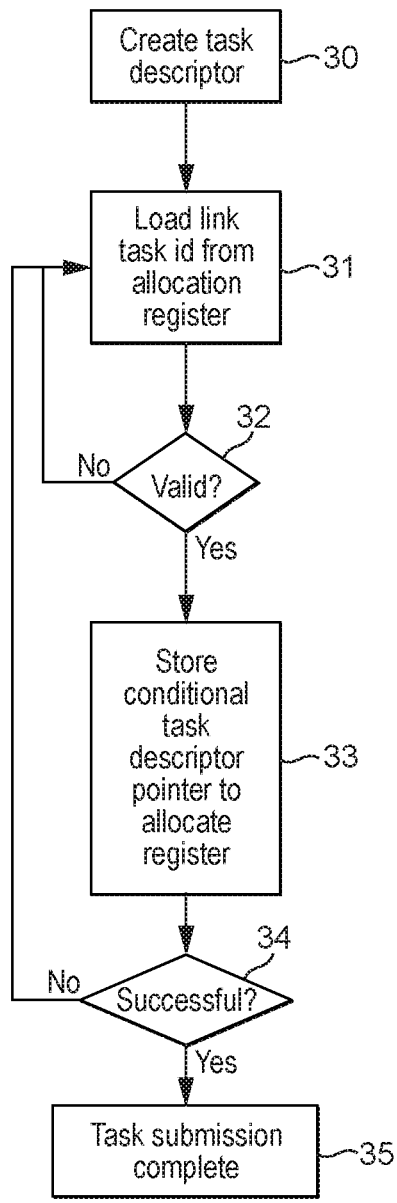
FIG. 3 shows schematically the submission of a task to the accelerator in an embodiment of the technology described herein.

FIG. 3 illustrates this operation. As shown in FIG. 3, the first step is for the application to create the descriptor for the task that it wishes to submit to the accelerator (step 30). The application then performs a load-link operation to load the task identifier from the allocate register (step 31). It is then determined whether the allocate register returns a valid task identifier or not (step 32). If not, as shown in FIG. 3, the process returns to the step of loading the task identifier from the allocate register (i.e. retries). On the other hand, if a valid task identifier is returned from the allocate register (i.e. thereby indicating that a physical register input/output interface for submission of the task is available), the corresponding linked conditional store will operate to store a pointer to the created task descriptor in the physical register input/output interface (step 33). If the atomic load-link/store-conditional operation is successful (step 34) then the task submission has been completed (step 35). Otherwise, the process returns to re-attempt the operation.

In this case (and otherwise), the allocate register and the physical input/output interface register that the task descriptor is written to may be the same register (e.g. in the case of an architecture that requires that the LL/SC load/store pair must be to the same address), or they may be different registers (e.g. if the system in question does not have such a restriction).

A "compare and swap" (CAS) atomic operation could also be used for task submission, as well as or instead of, an LL/SC operation, if desired. In this case a "potential task id" register should be provided that when read returns the expected value of the task identifier for the next task to be submitted. In this arrangement, the "potential task id" register should be read first (to obtain the expected value of the task id for the next task to be submitted), and thereafter a CAS operation performed on the "allocate" register with the expected read value for the "compare" being the read potential task id, and the new value to be written for the "swap" being the pointer to the task descriptor. If the CAS operation is successful, then the task has been submitted.

In the present embodiment, the virtual accelerator input/output interface mapping to a physical register input/output interface ends when task dispatch occurs. Thus, when an application writes the final register to dispatch its task to the accelerator 3, the allocation of the physical register input/output interface is lost (and the application can no longer access the physical register input/output interface). The completion of the task is then signalled by updating a memory location provided as part of the task setup. The application is configured to "spin" on this memory location until the task completes.

In an alternative arrangement, the virtual accelerator input/output interface mapping to the physical register input/output interface could be sustained until the application explicitly de-allocates the physical register input/output interface by writing to a register. Compared to ending the physical register input/output interface mapping on task dispatch, this will allow task completion to be signalled using a register rather than a memory location, but the physical register input/output interfaces will be tied to applications for a longer time (thereby potentially requiring a larger number of physical register input/output interfaces to efficiently schedule tasks on the accelerator (and also increasing the risk of an application being de-scheduled while it has a physical register input/output interface allocated)).

As discussed above, in the present embodiment, a given application thread will "spin" (periodically retry) its request for a physical register input/output interface allocation if its initial request fails, and, also, an application thread will "spin" on a memory location to monitor for the accelerator completing its task.

In the present embodiment, the spinning (waiting) is combined with a wait for event process. Thus the system is configured such that an application (an application thread) that is awaiting a physical register input/output interface allocation only retries its allocation request in response to a particular, "wake-up", event or events, such as an indication that a physical register input/output interface has become free (available). The system is configured to generate (at the appropriate time) appropriate "wake-up" events to trigger the retrying of allocation requests by applications. This is also done when waiting for a task to be completed.

This allows the spin waiting to be implemented in an energy efficient manner. This is used both when waiting on physical register input/output interface allocation and accelerator task completion.

In the present embodiment, the applications are configured to spin wait for a selected period of time, but then if a longer wait is required, the spinning application thread is de-scheduled, with the thread then being rescheduled in response to a particular event or events. This can then allow another application (or thread in the same application) to use the host processor (CPU) if the physical register input/output interface allocation does not seem likely to happen soon.

To facilitate this operation, as discussed above an "event timeout" register that all the virtual accelerator input/output interfaces access is provided. Each application, if it is "spin waiting" for a physical register input/output interface allocation or for accelerator task completion, writes an associated timeout value to the event timeout register.

The accelerator 12 implements a timeout counter that starts when the "event timeout" register is first written. The timeout counter is initialized to the value written and counts down to zero.

When zero is reached (the timeout expires) any application threads that are spin waiting are then de-scheduled.

In the present embodiment, the "de-scheduling" does not take place immediately the timeout register reaches zero, rather the arrangement is such that when an application (an application thread) "wakes up" to retry its allocation request (etc.), if the allocation request does not succeed at that time, the timeout counter is then checked, and if it has reached zero, the application (the application thread) is then de-scheduled (but if it has not reached zero, the application (the application thread) returns to its "waiting" state).

In the present embodiment, the arrangement is such that if the "event timeout" register is subsequently written with a value smaller than the current timeout count, then the timeout count is updated to the new lower value (if the written value is higher then it is ignored). Thus there is one "event timeout" register shared between all virtual accelerator input/output interfaces, and the earliest timeout configured is used for triggering a "de-schedule" event.

(Other arrangements for the timeout counter, such as the timeout count increasing, and the time out limit being set by the event timeout register value, would, of course, be possible.)

Any "de-scheduled" application (application thread) that is awaiting a physical input/output interface allocation and/or task completion is subsequently "re-scheduled" at a later time. The, e.g., operating system, could re-schedule the application thread at some later point in time, e.g. depending on a set of predefined scheduling policies, and/or a de-scheduled application (application thread) can indicate to the operating system that it is not required to be re-scheduled again until after a certain event or events have occurred. Such events may comprise, for example, an active task on the accelerator completing, a physical register input/output interface becoming available, and/or a given timeout period expiring. There could also be other events of interest, depending on the application that the thread belongs to.

In the present embodiment, the accelerator generates a "re-schedule" event and a "wake-up" event when a physical register input/output interface becomes available and/or (if different) when a task completes.

Thus in the present embodiment, an application thread will determine that it needs to wait for an event to occur before it can continue its operation (e.g. for a task to be submitted to the accelerator, or for a physical register input/output interface to become free), and then set an appropriate timeout in the "event timeout" register. The application will then execute an instruction to wait for the event in a power efficient manner, such as stopping program execution until an external event is registered by the host processor (CPU). Then, when an event occurs (which may be generated from any one of many sources, for example), the application thread will check if its wait condition has been met (i.e. if the event it is waiting for has occurred), and if so will continue its processing. On the other hand, if the application thread's wait condition has not been met, it will then check if its timeout has expired and if so, ask the operating system to be de-scheduled and, optionally, register a condition with the operating system for when it is to be re-scheduled. On the other hand, if its timeout has not yet expired, the thread will return to waiting for its wait event to occur.

In this way, the event timeout register is used before an application thread is de-scheduled, to allow the application to spin wait in a power efficient state for a limited period of time without interacting with the operating system, whilst ensuring that if the thread's allocation request condition is not met in a relatively short time, the application can be woken up and can ask the operating system to de-schedule the thread.

As shown in FIG. 2, as well as the virtual accelerator input/output interfaces 22, the interface mapping unit 21 also provides a number of operating system management interfaces 23. In the present embodiment, each operating system has its own separate OS management interface 23.

In the present embodiment, each OS management interface allows the operating system in question to: request changes to the OS level virtual accelerator input/output interface property table pointer (discussed below); inspect virtual accelerator input/output interface to physical register input/output interface mappings (only the physical register input/output interfaces allocated from the OS in question are visible); inspect status of running tasks on physical register input/output interfaces and manage them (only the physical register input/output interfaces allocated from the OS in question are visible); free allocated physical register input/output interfaces where an application with an active physical register input/output interface dies (again only the physical register input/output interfaces allocated from the OS in question are visible); pre-empt applications at any time (the state of physical register input/output interfaces allocated, but not yet dispatched, could be saved and restored, if desired); enable an interrupt for task completion when de-scheduling a thread waiting for a task to finish; and manipulate the MMU context used for a task.

In the present embodiment, the MMU address space identifier (ASID) of allocated physical register input/output interfaces and of running tasks belonging to an OS management interface can be determined. This allows the ASID mapping to applications to be updated.

In the present embodiment, the operating system management interfaces are implemented by providing access through the OS management interface to each of the physical register input/output interfaces, but only if the physical register input/output interfaces are processing a task from the same virtual machine (operating system). Thus as shown in FIG. 2, the interface unit 21 includes an access right check 24 for the operating system management interfaces 23.

Thus, in the present embodiment, the operating system virtual management interface is mapped to a physical register input/output interface as long as a task submitted from an application within that operating system is not complete. The operating system management interface also exposes additional registers from the physical register input/output interface to allow the operating system to communicate with the accelerator while the task is active.

As well as providing an operating system management interface that allows access to the physical register input/output interfaces, as shown in FIG. 2, the hypervisor 10 also has access to the physical register input/output interfaces, to correspondingly perform "management" functions.

The hypervisor management interface is supported by the same hardware as the OS management interfaces, but with different access rights applied compared to the virtual machines (operating systems). The hypervisor management interface is essentially a direct view of the physical register input/output interfaces, and may expose additional registers compared to the operating system virtual management interface.

In particular, the "hypervisor management interface" allows the hypervisor full access to all the physical register input/output interfaces 8, regardless of which virtual machine (i.e. OS) they are allocated to at the time in question. The hypervisor management interface also gives access to some functionality not exposed in the OS management interfaces: inspect which virtual machine a physical register input/output interface is currently allocated to, or an active task belongs to; receive requests from OS management interfaces for changes to the virtual accelerator input/output interface property table pointer; configure the hypervisor levels of the virtual accelerator input/output interface property table (discussed below)

To facilitate the access to the physical register input/output interfaces 8 by the operating systems and hypervisor via their management interfaces, and as the state of the physical register input/output interfaces accessed through the hypervisor and OS management interfaces can change at any time, all commands issued by an operating system and the hypervisor use (are associated with) the task identifier that identifies the task the command relates to.

Then, when an OS management interface is to be used to manipulate a task, the task identifier provided for the command is checked, and if the task in question is currently active on a physical register input/output interface and belongs to the OS management interface in question then the action requested is attempted, but otherwise the command is ignored. A status register or a memory location used to report task status is updated as appropriate.

The hypervisor management interface uses a similar mechanism, but with the difference that tasks belonging to any virtual machine (operating system) can be manipulated.

Figure 4:
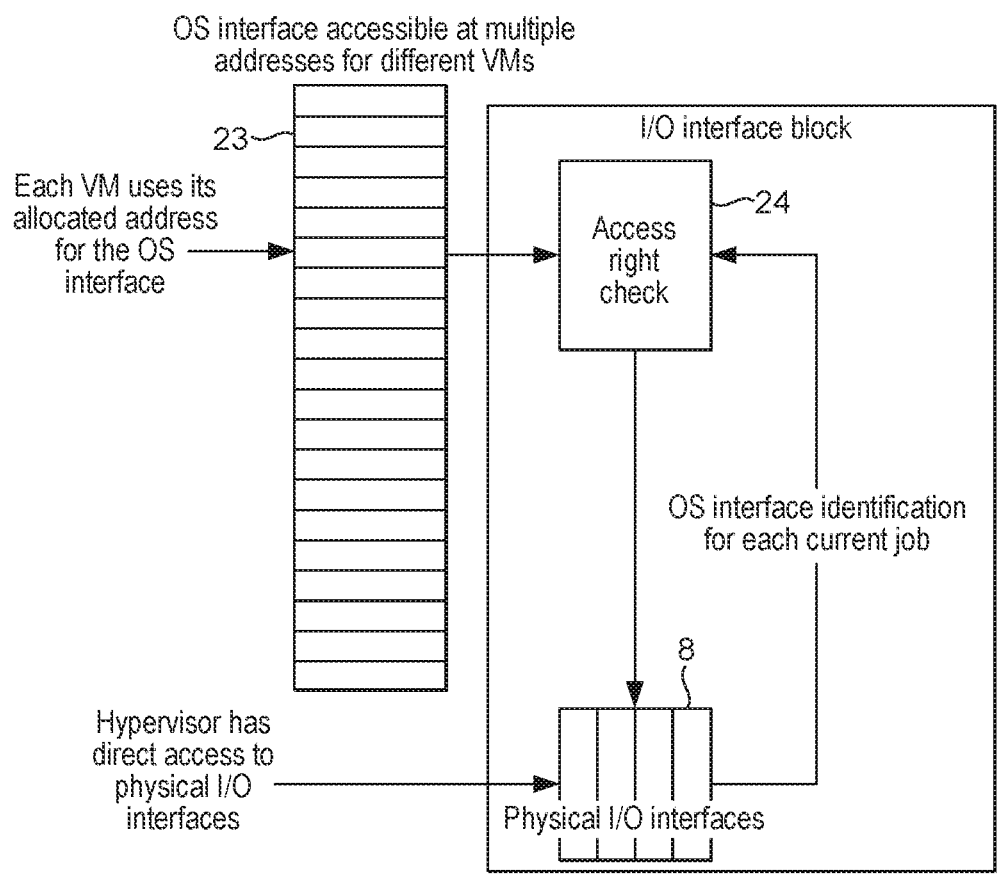
FIG. 4 shows schematically the mechanism for allowing operating systems and the hypervisor to access the physical register input/output interfaces of the accelerator in the described embodiment of the technology described herein.

FIG. 4 shows schematically the arrangement for allowing the operating systems and hypervisor to access the physical register input/output interfaces 8 in the present embodiment. As shown in FIG. 4, the hypervisor 10 has direct access to the physical register input/output interfaces 8, whereas each operating system (virtual machine) will use its allocated address for the operating system management interface 23 but there will then be an access right check 24 that compares the task identifier used in the command from the operating system with the task identifiers associated with the tasks allocated to the physical register input/output interfaces 8 to determine whether the operating system operation should be allowed access to a respective physical register input/output interface 8.

As shown in FIG. 2 and as discussed above, the data processing system 1 also comprises a virtual accelerator input/output interface property table 25. This virtual accelerator input/output interface property table contains data required for task submission to the accelerator 12 that is supplied by the hypervisor and the operating system in question. When a physical register input/output interface is mapped to a virtual accelerator input/output interface, the virtual accelerator input/output interface property table 25 is read to determine the data required for a task submission that is supplied by the hypervisor or the operating system.

The virtual accelerator input/output interface property table 25 can be configured as desired, for example as a single table, or as two table levels, one for the hypervisor and one for the virtual machine operating system, or as four table levels, two for the hypervisor and two for the virtual machine operating system, etc.

Figure 5:
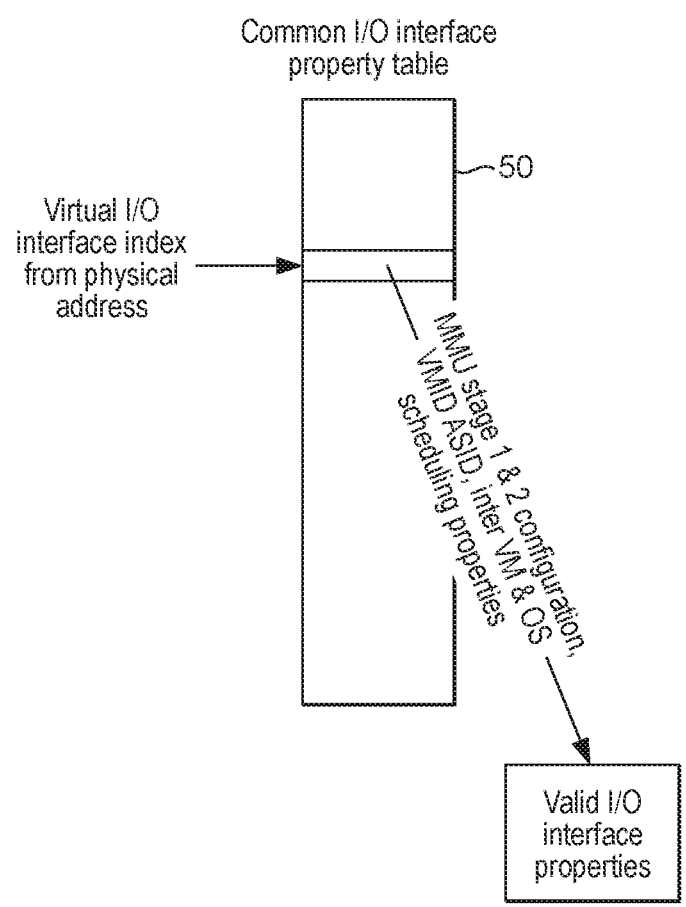
FIGS. 5, 6 and 7 show exemplary arrangements for the virtual accelerator input/output interface property table that may be used in the described embodiment of the technology described herein.

FIG. 5 shows an exemplary single level virtual accelerator input/output interface property table arrangement. In this case, there is a common virtual input/output interface property table 50 that is accessed using a virtual accelerator input/output interface index that is captured from the physical address used to address the virtual accelerator input/output interface, with the virtual accelerator input/output interface property table then indicating the MMU stage 1 and stage 2 configuration to use, the virtual machine (operating system) identifier (VMID), the MMU address space identifier for the application in question (ASID), and the inter-virtual machine and operating system scheduling properties.

This single table arrangement shown in FIG. 5 will require the hypervisor to be notified by the virtual machines (operating systems) for any page table configuration changes, but may allow for the smallest task dispatch latency as all the virtual accelerator input/output interface property information is collected in one place and a direct lookup can be made rather than a walk through a table structure.

Figure 6:
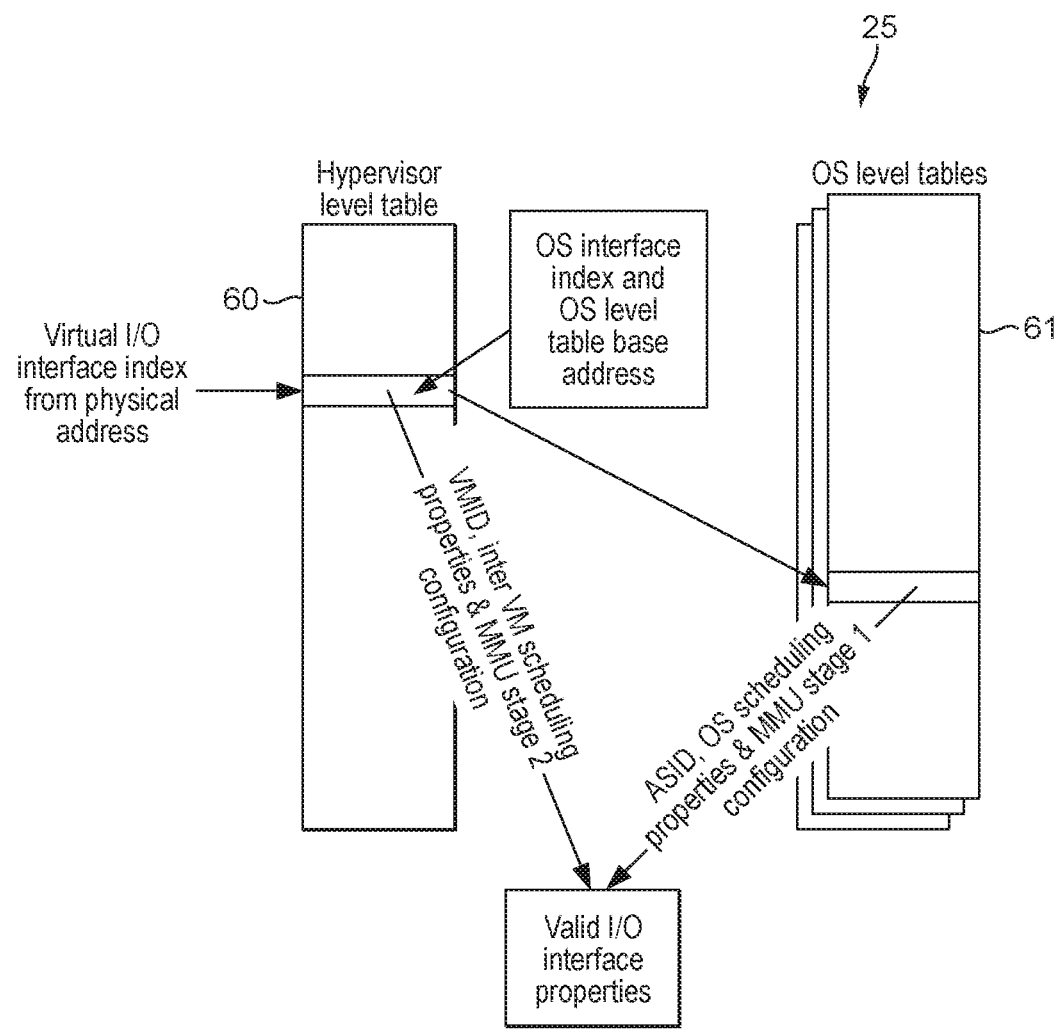
Figure 7:
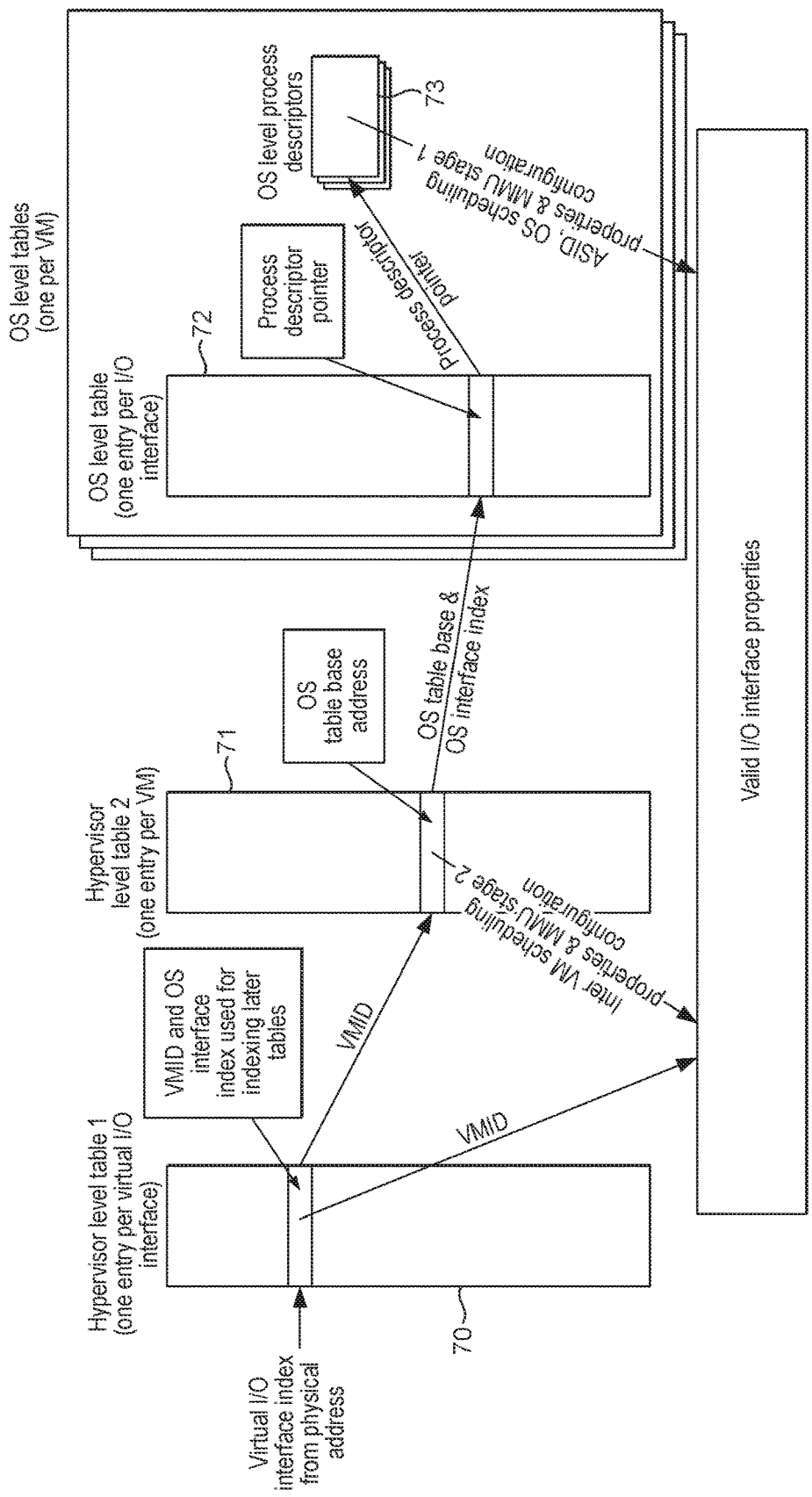

FIGS. 6 and 7 show exemplary multiple table level virtual accelerator input/output interface property table arrangements.

In these cases, the multiple tables are split into two main levels, hypervisor and OS. Each of the hypervisor and OS levels may also be split into two levels, a first level that identifies the VM/application, and a second level that provides the data for the recovered VMID/ASID (this allows for persistent accelerator MMU context across tasks, and can help reduce dispatch latency).

FIG. 6 shows a two level virtual accelerator input/output interface property table arrangement, having one hypervisor level table 60 and then separate operating system level tables 61.

In this case, when a physical register input/output interface is mapped to a virtual accelerator input/output interface, the virtual accelerator input/output interface property table 25is walked as follows.

The virtual accelerator input/output interface index is captured from the physical address used to address the virtual accelerator input/output interface, and the hypervisor level 60 of the virtual accelerator input/output interface property table is looked up and the following information read: VMID for the virtual accelerator input/output interface; Stage 2 MMU configuration information; Pointer to OS level virtual accelerator input/output interface property table base; Index into OS level virtual accelerator input/output interface property table; and VM level scheduling properties.

The OS level virtual accelerator input/output interface property table entry recovered from the hypervisor level table 60then is looked up, and the following information then read from the OS level virtual accelerator input/output interface property table 61: ASID for the virtual accelerator input/output interface; Stage 1 MMU configuration information; and OS level scheduling properties.

FIG. 7 shows a multi-level virtual accelerator input/output interface property table in which the hypervisor level tables and the OS level tables each contain two table levels.

In this case, the virtual accelerator input/output interface property table walk is as follows.

The virtual accelerator input/output interface index is captured from the physical address used to address the virtual accelerator input/output interface, and the first hypervisor level 70 of the virtual accelerator input/output interface property table is looked up and the following information read: VMID for the virtual accelerator input/output interface; and OS level virtual accelerator input/output interface index.

The read VMID is then used to index the second hypervisor level 71 of the virtual accelerator input/output interface table, and the following information is read: Stage 2 MMU configuration information; Pointer to OS level virtual accelerator input/output interface property table base; and VM level scheduling properties.

The OS level virtual accelerator input/output interface index recovered from the hypervisor level table is then used to look up the first level 72 of the OS level virtual accelerator input/output interface property table, and the following information is read: Pointer to OS level input/output interface property descriptor.

The indicated OS level input/output interface property descriptor 73 is then read to determine: the ASID to use; the Stage 1 MMU configuration information and the OS level scheduling properties.

(The OS level indirection is only needed if more than one virtual accelerator input/output interface can be mapped to an application. It allows the OS to update a single location with the ASID for the application when it is scheduled. The OS kernel needs to consider the ASID for any task running or pending on the accelerator when updating the ASID mapping for applications.)

Other arrangements for the virtual accelerator input/output interface property table 25, such as other combinations of the simple and complex virtual accelerator input/output interface property tables for the hypervisor and OS levels (e.g. either of the hypervisor or OS level tables may use the simple or complex format) may be used if desired.

As well as the information discussed above, the virtual accelerator input/output interface property table may also contain other information, for example restrictions on allowed operations. Some form of caching of the virtual accelerator input/output interface property table may be used to ensure walking the virtual accelerator input/output interface property table is not the critical path for task dispatch latency, if desired.

Figure 8:
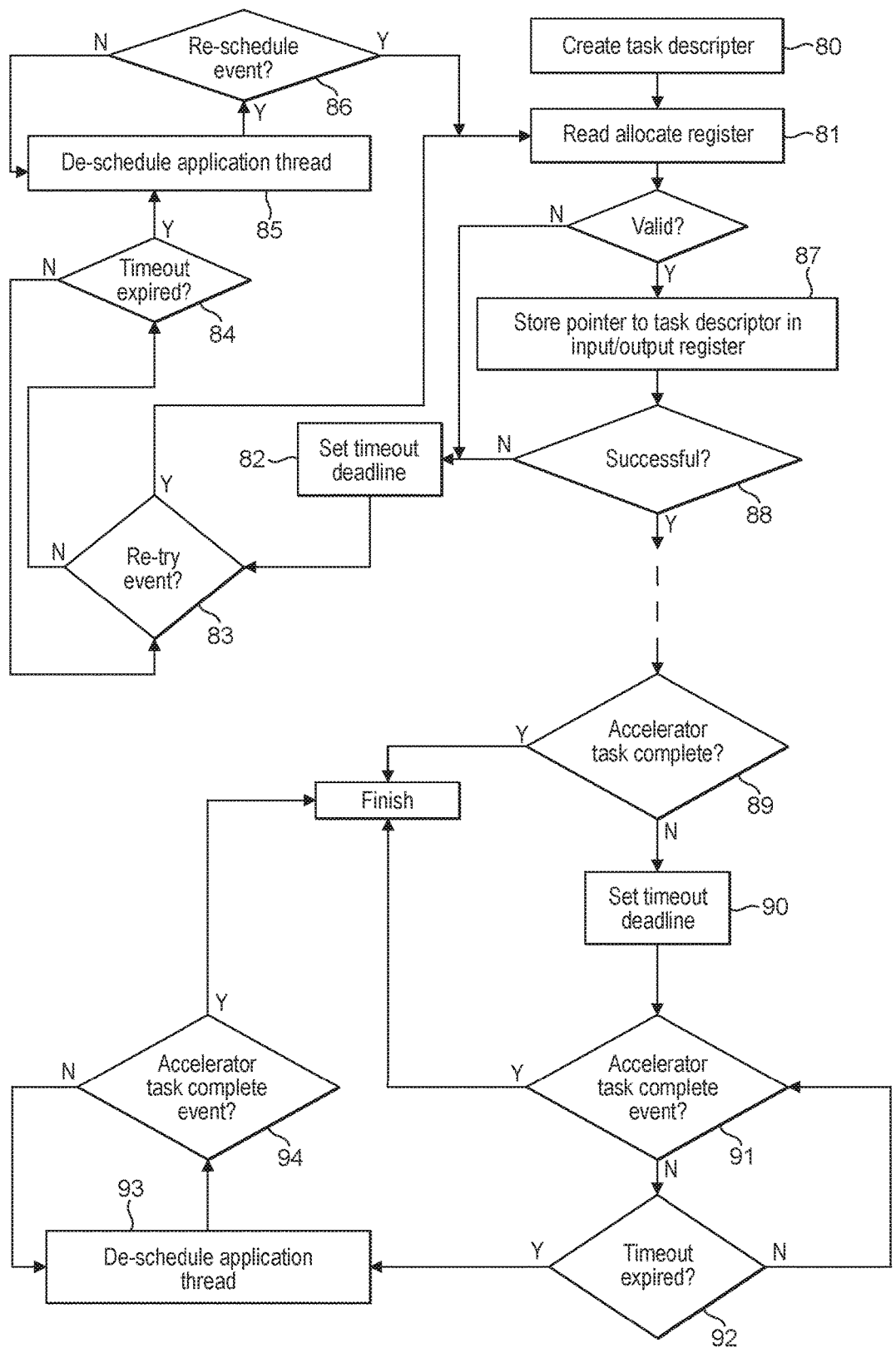
FIG. 8 shows the operation of the embodiment of the technology described herein.

As will be appreciated from the above, in the above embodiment, the process of dispatching a task to the accelerator and the task being completed (in an arrangement which uses an LL/SC atomic operation for submitting the task atomically) will be as illustrated in FIG. 8.

First, the application on the host processor (CPU) will prepare the data structures ("task descriptors") required for the accelerator to perform the task (step 80).

The host CPU application will then read the allocate register via its associated virtual input/output interface using load-linked semantics (step 81).

If the value read is zero, then the physical input/output interface allocation has failed, and so the application will wait a little while and then attempt its allocation request again. As discussed above, in the present embodiment, this will involve first waiting for an event to occur, namely a physical register input/output interface becoming free, before the allocation request is retried, and de-scheduling the application thread if the allocation attempt is not successful within a given timeout period.

To do this, the application determines a suitable deadline for when to stop using the "wait for event" state to wait on a physical register input/output interface becoming free (as this may block the CPU core), and to instead de-schedule the application thread (thereby allowing other tasks to be executed on the CPU core, but increasing latency from a physical register input/output interface becoming free to the accelerator working on the task). The delay for the deadline for this process may vary depending on the application, but a suitable timeout period could be, for example, 10% of the host CPU scheduling quanta.

The application then sets a timeout in the event timeout register for the deadline that it has calculated (step 82), and waits for an event to occur using the "wait for event" state. As events may be generated for many reasons, the application checks the event and whether the timeout has completed when exiting the wait for event state.

When the application exits the wait for event state, it checks if the appropriate event has occurred (in this case a physical register input/output interface becoming free) (step 83). If so, it re-tries its allocation request (step 81).

If the appropriate event has not occurred, the application then checks if the timeout deadline has passed (step 84). If not, it then returns to the "wait for event" state and monitoring the timeout deadline.

If the timeout deadline has passed, then the application thread is de-scheduled (step 85) and requested to resume (to be re-scheduled) when an appropriate event occurs (in this case a physical register input/output interface becoming free) (step 86). This allows other tasks to be executed on the CPU core, but will increase latency from a physical register input/output interface becoming free to the accelerator working on the task.

On the other hand, if the value read from the allocate register is non-zero, then the allocation of the physical register input/output interface was successful. The returned read value is the used as an identifier for the task in question, and will be kept by the host CPU application to allow future manipulation and management of the task (e.g. to query its status, identify error messages, control the task, etc.).

The host CPU application will then write a pointer to the main task descriptor to the appropriate physical input/output register (e.g. to the allocate register) using store-conditional semantics (step 87). If this write operation fails, then the task has not yet been dispatched and the task identifier read from the allocate register will no longer be valid. In this case, the application on the host CPU will return to trying its allocation request again. (A typical cause for this would be that another thread/application has submitted a task at the same time.)

On the other hand, if the write operation succeeds, then the task has been submitted to the accelerator (step 88).

The host CPU application may then, e.g., do some other processing in parallel with the accelerator task, but will eventually (and in some cases immediately) reach a point where it depends on the result of the accelerator task. In this case, if the accelerator has not yet completed the task, the host CPU application will need to wait for the accelerator to finish the task. In the present embodiment, the completion of the accelerator task is signalled by modifying a memory location and by signalling the event to wake the CPU from a "wait for event" state.

In the present embodiment, the host CPU application implements power-efficient waiting by the following steps.

The application first checks if the accelerator task is complete (step 89). If so, the accelerator task is finished and the host CPU application can then use the output data from the accelerator task.

If the accelerator task is not yet complete, then application determines a suitable deadline for when to stop using the "wait for event" state to wait on accelerator task completion (as this may block the CPU core), and to instead deschedule the application thread (thereby allowing other tasks to be executed on the CPU core, but increasing latency from the accelerator task completion to the CPU application working on the task output data). The delay for the deadline for this process may vary depending on the application, but a suitable timeout period could be, for example, 10% of the host CPU scheduling quanta.

The application then sets a timeout in the event timeout register for the deadline that it has calculated (step 90), and waits for an event to occur using the "wait for event" state. As events may be generated for many reasons, the application checks the event and whether the timeout has completed when exiting the wait for event state.

When the application exits the wait for event state, it checks if the appropriate event has occurred (in this case that accelerator task is complete) (step 91) (and if it is, then proceeds to use the output data from the accelerator task).

If the appropriate event (accelerator task completion) has not occurred, the application checks if the timeout deadline has passed (step 92). If not, it returns to the "wait for event" state and monitoring the timeout deadline.

If the timeout deadline has passed, then the CPU application thread is de-scheduled (step 93) and requested to resume (to be re-scheduled) when an appropriate event occurs (in this case when the accelerator task completes) (step 94). This allows other tasks to be executed on the CPU core, but will increase latency from accelerator task completion to the CPU application working on the task output data.

Various alternative and additions to the present embodiment would be possible, if desired.

For example, if the accelerator is a graphics processing unit (GPU) and it is desired to support graphics processing tasks, then the system could support task chains for graphics (whereas for compute jobs a single task is sufficient in most cases). Thus, each application that creates graphics tasks is in an embodiment allocated a number of virtual accelerator input/output interfaces, and can dispatch graphics tasks on these as required.

Graphics may also require additional types of tasks such as pixel shading or tile polygon list creation with more complex input data. Where graphics tasks are to be supported, then in an embodiment a larger number of physical register input/output interfaces is provided as this will enhance throughput (as graphics tasks tend to be longer and to benefit from running in parallel).

The GPU may, e.g., directly receive the tasks created and arbitrate between them.

Alternatively or additionally, where the GPU has an associated microcontroller unit (MCU), the physical register input/output interfaces could feed in as requests to the MCU, and the MCU could then schedule the requested tasks on the GPU as appropriate, and/or the physical register input/output interfaces could be directly arbitrated by the task scheduler for minimizing the task dispatch latency, with the MCU periodically retrieving statistics on tasks dispatched, and, e.g., implementing a scheduling policy by adjusting task scheduler scheduling parameters or by pre-empting the directly dispatched tasks if required.

If the accelerator supports sharing of page tables with the CPU then synchronous dispatch descriptors and working memory could be allocated from the CPU thread stack. However, it may be advantageous to ensure that memory used by the accelerator is pinned to avoid stalling the accelerator due to page swap. In systems where swapping is not a concern (or if the accelerator supports page swap efficiently) then accelerator task dispatch becomes very simple from the application software point of view: initiate data structures on stack (if required); allocate virtual accelerator input/output interface; write registers in virtual accelerator input/output interface to dispatch job.

The technology described herein could also be used to create a "virtualisation interface" by combining this technology described herein with a two stage address translation service. This could then be used to control access to an existing accelerator design with very little or no modification to the accelerator itself being needed to enable it to be used with virtualization (either virtualized between multiple applications or across multiple virtual machines or both).

Figure 9:
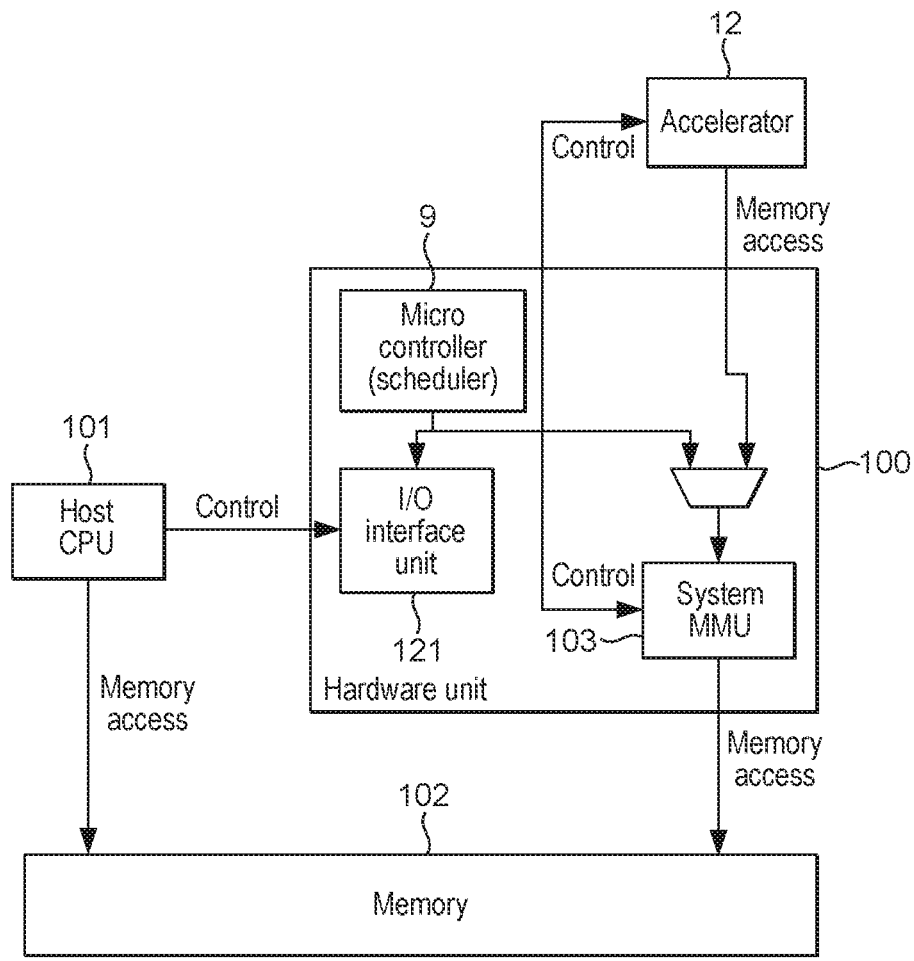
FIG. 9 shows schematically a further embodiment of the technology described herein in the form of a virtualisation interface.

FIG. 9 shows an embodiment of such a virtualisation interface.

As shown in FIG. 9, the virtualisation interface 100 would interface between an accelerator 12 and a host CPU 101 and allow access to memory 102 that is shared with the host CPU.

Virtualisation interface 100 includes an appropriate interface mapping unit 21 that provides the physical register input/output interfaces and virtual accelerator input/output interfaces, etc., as discussed above, and a microcontroller (MCU) that acts, inter alia, as a task scheduler 9. Virtualisation interface 100 also includes a system MMU 103.

This virtualisation interface 100 can then provide a means to enable an existing accelerator to be used by several applications and/or virtual machines with little or no modifications to the accelerator itself. The virtualisation interface 100 will expose a virtual register interface to each application, and the microcontroller will receive instructions entered in the physical register input/output interfaces, and then schedule the tasks from the different applications on the accelerator. The system MMU provides the data plane separation between the tasks from different applications/virtual machines, and is configured by the microcontroller in step with the task scheduling.

It can be seen from the above that the technology described herein, in its embodiments at least, provides a system for the automatic on demand allocation of physical accelerator register input/output interfaces to applications, so as to enable dispatch of tasks to a GPU or other accelerator in a virtualized system, for example. The method and system described is particularly suitable for low latency synchronous dispatch of small compute jobs, but could be applied also for asynchronous dispatch and other workloads (such as graphics acceleration).

Advantages of the technology described herein include direct low latency task submission from applications and support for a large number of virtual machines (not limited to the number of physical register input/output interfaces).

The technology described herein, in its embodiments at least, can provide low latency synchronous dispatch and efficient completion for small compute tasks. Indeed, it is believed that an optimized implementation of this technology described herein could reduce dispatch (and completion) latencies to less than a thousand CPU cycles.

The application interface for task dispatch is very simple. If the system supports shared page tables and memory coherency between the host CPU and the accelerator then the application interface comprises allocating an input/output interface, writing the registers to dispatch the task, and waiting for task completion. No buffer marshalling or other setup is required by the application (assuming any compute kernel required is pre-compiled).

In a system supporting shared page tables and coherency the following functions should be sufficient to support synchronous dispatch of compute jobs: map virtual accelerator input/output interface to application when first attempting to access; keep virtual accelerator input/output interface property table up to date (i.e. ensure MMU page table changes are updated); take tasks running or pending on accelerator into account when remapping MMU address space identifiers for tasks (for synchronous dispatch new tasks can in an embodiment only be created from running CPU threads—this makes the MMU address space identifier management substantially simpler than for a queue based system).

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A data processing system comprising:
one or more processors that each execute one or more operating systems, each operating system including one or more applications; and
an accelerator that provides a shared resource configured to perform tasks for a plurality of the one or more applications included in each operating system; and
wherein the data processing system further comprises:
one or more sets of physical registers that act as one or more physical register input/output interfaces for submission of tasks to the accelerator; and
an interface mapping unit that provides a plurality of virtual accelerator input/output interfaces to the plurality of the one or more applications, the plurality of virtual accelerator input/output interfaces being allocated to respective applications, the interface mapping unit being configured to dynamically map the plurality of virtual accelerator input/output interfaces to the one or more physical register input/output interfaces to thereby enable tasks from the plurality of the one or more applications to be dispatched to the accelerator by mapping a virtual accelerator input/output interface that has been allocated to the application in question to a free physical register input/output interface of the one or more physical register input/output interfaces provided for the submission of tasks to the accelerator;
wherein each virtual accelerator input/output interface of the plurality of virtual accelerator input/output interfaces has an allocate register associated with it; and, in order for an application to be able to dispatch a task to the accelerator, the application reads the allocate register associated with the virtual accelerator input/output interface allocated to the application, thereby triggering the allocation of a free physical register input/output interface to the application;
wherein the interface mapping unit is configured to, in response to an application reading the allocate register associated with a virtual accelerator input/output interface that has been allocated to the application:
determine whether a physical register input/output interface of the one or more physical register input/output interfaces is currently free, and when it is, to map the free physical register input/output interface to the virtual accelerator input/output interface that the application has been allocated to, and to return to the application in response to the read of the allocate register a value that indicates that a physical register input/output interface is currently free and has been allocated to the application, wherein the value acts as an identifier for the task that uniquely identifies the task dispatched by the application; and
wherein, in response to receiving the value from the interface mapping unit, the application writes task description data and/or a pointer pointing to task description data to a register or registers associated with the allocated physical register input/output interface and dispatches the task to the accelerator.

2. The system of claim 1, wherein the accelerator comprises one of: a graphics processing unit, an encryption accelerator, a video accelerator, a network interface, a digital signal processor (DSP), or audio hardware.

3. The system of claim 1, wherein the virtual accelerator input/output interfaces are mapped to applications on demand by the operating system or systems, and/or the virtual accelerator input/output interfaces are mapped to an operating system or systems on demand by a hypervisor.

4. The system of claim 1, wherein when a physical register input/output interface is allocated to an application, the application then communicates the appropriate description of the task it requires to the accelerator by placing appropriate data in the register or registers of the physical register input/output interface in question.

5. The system of claim 1, wherein the allocation of a physical register input/output interface to an application and the subsequent submission of the task to the accelerator is performed as an atomic operation.

6. The system of claim 5, wherein the atomic operation is a load-link store-conditional atomic transaction or a compare and swap atomic operation.

7. The system of claim 1, wherein if an application's request for a physical register input/output interface allocation is unsuccessful, the application retries its allocation request in response to a particular event or events, and the system is configured to signal events to trigger the retrying of allocation requests by applications; and
wherein applications waiting for a physical register input/output interface allocation are de-scheduled from retrying their allocation requests after the expiry of a de-schedule timeout process, each application has a de-schedule timeout value associated with it that is used for this purpose, and all waiting applications share the same de-schedule timeout counter, with the de-schedule timeout counter using the earliest timeout value of the currently waiting applications.

8. The system of claim 1, wherein the interface mapping unit also supports and exposes one or more operating system management interfaces and/or one or more hypervisor management interfaces to be used for the management of accelerator tasks that are in progress.

9. The system of claim 1, further comprising a virtual accelerator input/output interface property table that contains data required for accelerator task submission that is supplied by a hypervisor and/or operating system.

10. A method of operating a data processing system that comprises:
one or more processors that each execute one or more operating systems, each operating system including one or more applications;
an accelerator that provides a shared resource configured to perform tasks for a plurality of the one or more applications included in each operating system;
one or more sets of physical registers that act as one or more physical register input/output interfaces for submission of tasks to the accelerator; and
an interface mapping unit that exposes a plurality of virtual accelerator input/output interfaces to the plurality of the one or more applications, the plurality of virtual accelerator input/output interfaces being allocated to respective applications, and configured to dynamically map the plurality of virtual accelerator input/output interfaces to the one or more physical register input/output interfaces for the accelerator, wherein each virtual accelerator input/output interface has an allocate register associated with it;
the method comprising:
an application when it wishes to dispatch a task to the accelerator, reading the allocate register associated with a virtual accelerator input/output interface to which the application has been allocated, to thereby trigger allocation of a free physical register input/output interface to the application;
the interface mapping unit in response to the application reading the allocate register associated with the virtual accelerator input/output interface that has been allocated to the application, determining whether a physical register input/output interface of the one or more physical register input/output interfaces for the submission of a task to the accelerator is free, and when a physical register input/output interface is free, mapping the virtual input/output interface to the free physical register input/output interface to thereby allow the application to dispatch its task to the accelerator, and returning to the application a value that indicates that a physical register input/output interface is currently free and has been allocated to the application, wherein the value acts as an identifier that uniquely identifies the task dispatched by the application;
wherein, in response to receiving the value from the interface mapping unit, the application writing task description data and/or a pointer pointing to task description data to a register or registers associated with the allocated physical register input/output interface and dispatching the task to the accelerator.

11. The method of claim 10, wherein the accelerator comprises one of: a graphics processing unit, an encryption accelerator, a video accelerator, a network interface, a digital signal processor (DSP), or audio hardware.

12. The method of claim 10, wherein the virtual accelerator input/output interfaces are mapped to applications on demand by the operating system or systems, and/or the virtual accelerator input/output interfaces are mapped to an operating system or systems on demand by a hypervisor.

13. The method of claim 10, wherein when a physical register input/output interface is allocated to an application, the application then communicates the appropriate description of the task it requires to the accelerator by placing appropriate data in the register or registers of the physical register input/output interface in question.

14. The method of claim 10, wherein the allocation of a physical register input/output interface to an application and the subsequent submission of the task to the accelerator is performed as an atomic operation.

15. The method of claim 14, wherein the atomic operation is a load-link store-conditional atomic transaction or a compare and swap atomic operation.

16. The method of claim 10, further comprising: if an application's request for a physical register input/output interface allocation is unsuccessful, the application retrying its allocation request in response to the signaling of a particular event by the system; and
wherein applications waiting for a physical register input/output interface allocation are de-scheduled from retrying their allocation requests after the expiry of a de-schedule timeout process, each application has a de-schedule timeout value associated with it that is used for this purpose, and all waiting applications share the same de-schedule timeout counter, with the de-schedule timeout counter using the earliest timeout value of the currently waiting applications.

17. The method of claim 10, wherein the interface mapping unit also supports and exposes one or more operating system management interfaces and/or one or more hypervisor management interfaces to be used for the management of accelerator tasks that are in progress.

18. The method of claim 10, further comprising storing in a virtual accelerator input/output interface property table data required for accelerator task submission that is supplied by a hypervisor and/or operating system.

19. A data processing system comprising:
one or more processors that each execute one or more operating systems, each operating system including one or more applications, each application when executing, executing one or more application threads, each application thread having an associated event timeout period value; and
an event timeout register to which an application thread can write its associated event timeout period value when the application thread is waiting for an event to occur before it can continue its operation;
wherein for each application thread, its associated event timeout period value indicates a time period after which the application thread will request to be de-scheduled if the event that the application thread is waiting for has not happened yet;
wherein the event timeout register is shared between plural applications of the one or more applications, such that threads from the plural applications each write their associated event timeout period values to the same, shared event timeout register;
wherein each of the application threads of the plural applications that share the event timeout register writes its associated event timeout period value to the event timeout register when said application thread starts waiting for an event to occur; and wherein the data processing system maintains a de-schedule timeout counter, wherein if the event timeout register is written to by a newly waiting application thread having an associated event timeout period value that is smaller than a current timeout counter value, then the timeout count is updated to the event timeout period value of the newly waiting application thread, wherein when the event timeout counter is used to signal a de-schedule event that de-schedules all the waiting application threads that have written their associated timeout period value to the event timeout register.

20. A hardware unit for use in a data processing system, the data processing system comprising one or more processors that each execute one or more operating systems, each operating system including one or more applications, an accelerator that provides a shared resource configured to perform tasks for a plurality of the one or more applications included in each operating system, and one or more sets of physical registers that act as one or more physical register input/output interfaces that can be used for submission of tasks to the accelerator; wherein the hardware unit is configured to:

expose a plurality of virtual accelerator input/output interfaces to a plurality of applications executing on a processor or processors, and to dynamically map the plurality of virtual accelerator input/output interfaces to one or more physical register input/output interfaces for an accelerator to thereby enable tasks from the plurality of the one or more applications to be dispatched to the accelerator by mapping a virtual accelerator input/output interface that has been allocated to an application to a free physical register input/output interface of the one or more physical register input/output interfaces that is to be used for the submission of tasks to the accelerator;

wherein each virtual accelerator input/output interface of the plurality of virtual accelerator input/output interfaces has an allocate register associated with it; and, in order for an application to be able to dispatch a task to the accelerator, the application reads the allocate register associated with the virtual accelerator input/output interface that has been allocated to the application, thereby triggering the allocation of a free physical register input/output interface to the virtual accelerator input/output interface allocated to the application, and returning to the application a value that indicates that a physical register input/output interface is currently free and has been allocated to the application, wherein the value acts as an identifier that uniquely identifies the task dispatched by the application;

wherein, in response to receiving the value that indicates that a physical register input/output interface is currently free, the application writes task description data and/or a pointer pointing to task description data to a register or registers associated with the allocated physical register input/output interface and dispatches the task to the accelerator.

21. The hardware unit of claim 20, further comprising one or more of:

a task scheduler that can arbitrate between tasks allocated to the physical register input/output interfaces and that can cause the accelerator to execute tasks that are allocated to the physical register input/output interfaces; and a system memory management unit.

22. A non-transitory computer readable storage medium storing computer software code which when executing on a processor performs a method of operating a data processing system that comprises:

one or more processors that each execute one or more operating systems, each operating system including one or more applications;

an accelerator that provides a shared resource configured to perform tasks for a plurality of the one or more applications included in each operating system;

one or more sets of physical register that act as one or more physical register input/output interfaces for submission of tasks to the accelerator; and an interface mapping unit that exposes a plurality of virtual accelerator input/output interfaces to the plurality of the one or more applications, the plurality of virtual accelerator input/output interfaces being allocated to respective applications, and configured to dynamically map the plurality of virtual accelerator input/output interfaces to the one or more physical register input/output interfaces for the accelerator, wherein each virtual accelerator input/output interface has an allocate register associated with it;

the method comprising:

an application when it wishes to dispatch a task to the accelerator, reading the allocate register associated with a virtual accelerator input/output interface to which the application has been allocated, to thereby trigger allocation of a free physical register input/output interface to the application:

the interface mapping unit in response to the application reading the allocate register associated with the virtual accelerator input/output interface that has been allocated to the application, determining whether a physical register input/output interface of the one or more physical register input/output interfaces for the submission of a task to the accelerator is free, and when a physical register input/output interface is free, mapping the virtual accelerator input/output interface to the free physical register input/output interface to thereby allow the application to dispatch its task to the accelerator, and returning to the application a value that indicates that a physical register input/output interface is currently free and has been allocated to the application, wherein the value acts as an identifier that uniquely identifies the task dispatched by the application;

wherein, in response to receiving the value from the interface mapping unit, the application writing task description data and/or a pointer pointing to task description data to a register or registers associated with the allocated physical register input/output interface and dispatching the task to the accelerator.

* * * * *